US010447347B2

(12) United States Patent
Raj et al.

(10) Patent No.: US 10,447,347 B2
(45) Date of Patent: Oct. 15, 2019

(54) WIRELESS CHARGER AND HIGH SPEED DATA OFF-LOADER

(71) Applicant: MC10, Inc., Lexington, MA (US)

(72) Inventors: Milan Raj, Natick, MA (US); Bryan McGrane, Denver, CO (US); Valerie Susan Hanson, Medford, MA (US); Brian Murphy, Medford, MA (US); Emily Plumb, Somerville, MA (US)

(73) Assignee: MC10, Inc., Lexington, MA (US)

( * ) Notice: Subject to any disclaimer, the term of this patent is extended or adjusted under 35 U.S.C. 154(b) by 0 days.

(21) Appl. No.: 15/676,348

(22) Filed: Aug. 14, 2017

(65) Prior Publication Data

US 2018/0205417 A1    Jul. 19, 2018

Related U.S. Application Data

(60) Provisional application No. 62/374,510, filed on Aug. 12, 2016.

(51) Int. Cl.
*H04B 5/00* (2006.01)
*H02J 7/02* (2016.01)
(Continued)

(52) U.S. Cl.
CPC ............ *H04B 5/0037* (2013.01); *H02J 7/025* (2013.01); *H02J 50/10* (2016.02); *H02J 50/80* (2016.02);
(Continued)

(58) Field of Classification Search
CPC ... H04B 1/3883; H04B 5/0025–5/0037; H04B 1/3888; H04B 5/00; H04B 5/0075;
(Continued)

(56) References Cited

U.S. PATENT DOCUMENTS 3,207,694 A    9/1965 Gogek
3,716,861 A    2/1973 Root
(Continued)

FOREIGN PATENT DOCUMENTS

CN    101084038 A    12/2007
CN    202068986 U    12/2011
(Continued)

OTHER PUBLICATIONS

Carvalhal et al., "Electrochemical Detection in a Paper-Based Separation Device", Analytical Chemistry, vol. 82, No. 3, (1162-1165) (4 pages) (Jan. 7, 2010).
(Continued)

*Primary Examiner* — Nhan T Le
(74) *Attorney, Agent, or Firm* — Nixon Peabody LLP

(57) ABSTRACT

A wireless charging system for a wearable sensor device can include a wireless charging device and a user device. The wireless charging device can include a transmitter for sending a power signal to charge the wearable sensor device, a first receiver to receive a data signal and a second to receive a low energy signal. The wearable sensor device can include at least one memory for storing sensor data, a first receiver for receiving the power signal from the wireless charging device, a first transmitter to transmit a data signal and a second receive to receive a low energy signal. The user device can include a low energy transmitter for communicating with the wireless charging device and sensor device to control the charging function and the data communication function of the wireless charging device to selectively charge and transfer data with wearable sensor device.

34 Claims, 4 Drawing Sheets

(51) Int. Cl.
  *H02J 50/10* (2016.01)
  *H02J 50/80* (2016.01)
  *H02J 7/00* (2006.01)

(52) U.S. Cl.
  CPC ..... *H02J 2007/0098* (2013.01); *H04B 5/0081* (2013.01)

(58) Field of Classification Search
  CPC .. H02J 7/0027; H02J 50/80; H02J 2007/0096; H02J 2007/0098; H02J 50/10; H02J 7/0052; H02J 2007/0062; H02J 7/02
  See application file for complete search history.

(56) References Cited

U.S. PATENT DOCUMENTS

| | | |
|---|---|---|
| 3,805,427 A | 4/1974 | Epstein |
| 3,838,240 A | 9/1974 | Schelhorn |
| 3,892,905 A | 7/1975 | Albert |
| 4,136,162 A | 1/1979 | Fuchs |
| 4,278,474 A | 7/1981 | Blakeslee |
| 4,304,235 A | 12/1981 | Kaufman |
| 4,416,288 A | 11/1983 | Freeman |
| 4,658,153 A | 4/1987 | Brosh |
| 4,911,169 A | 3/1990 | Ferrari |
| 4,968,137 A | 11/1990 | Yount |
| 5,059,424 A | 10/1991 | Cartmell |
| 5,064,576 A | 11/1991 | Suto |
| 5,272,375 A | 12/1993 | Belopolsky |
| 5,278,627 A | 1/1994 | Aoyagi |
| 5,306,917 A | 4/1994 | Black |
| 5,326,521 A | 7/1994 | East |
| 5,331,966 A | 7/1994 | Bennett |
| 5,360,987 A | 11/1994 | Shibib |
| 5,413,592 A | 5/1995 | Schroeppel |
| 5,471,982 A | 5/1995 | Edwards |
| 5,454,270 A | 10/1995 | Brown |
| 5,491,651 A | 2/1996 | Janic |
| 5,567,975 A | 10/1996 | Walsh |
| 5,580,794 A | 12/1996 | Allen |
| 5,617,870 A | 4/1997 | Hastings |
| 5,676,144 A | 10/1997 | Schoendorfer |
| 5,811,790 A | 9/1998 | Endo |
| 5,817,008 A | 10/1998 | Rafert |
| 5,907,477 A | 5/1999 | Tuttle |
| 6,063,046 A | 5/2000 | Allum |
| 6,220,916 B1 | 4/2001 | Bart |
| 6,265,090 B1 | 7/2001 | Nishide |
| 6,270,872 B1 | 8/2001 | Cline |
| 6,282,960 B1 | 9/2001 | Samuels |
| 6,343,514 B1 | 2/2002 | Smith |
| 6,387,052 B1 | 5/2002 | Quinn |
| 6,410,971 B1 | 6/2002 | Otey |
| 6,421,016 B1 | 7/2002 | Phillips |
| 6,450,026 B1 | 9/2002 | Desarnaud |
| 6,455,931 B1 | 9/2002 | Hamilton |
| 6,567,158 B1 | 5/2003 | Falcial |
| 6,626,940 B2 | 9/2003 | Crowley |
| 6,628,987 B1 | 9/2003 | Hill |
| 6,641,860 B1 | 11/2003 | Kaiserman |
| 6,775,906 B1 | 8/2004 | Silverbrook |
| 6,784,844 B1 | 8/2004 | Boakes |
| 6,825,539 B2 | 11/2004 | Tai |
| 6,965,160 B2 | 11/2005 | Cobbley |
| 6,987,314 B1 | 1/2006 | Yoshida |
| 7,259,030 B2 | 8/2007 | Daniels |
| 7,265,298 B2 | 9/2007 | Maghribi |
| 7,302,751 B2 | 12/2007 | Hamburgen |
| 7,337,012 B2 | 2/2008 | Maghribi |
| 7,487,587 B2 | 2/2009 | Vanfleteren |
| 7,491,892 B2 | 2/2009 | Wagner |
| 7,521,292 B2 | 4/2009 | Rogers |
| 7,557,367 B2 | 7/2009 | Rogers |
| 7,618,260 B2 | 11/2009 | Daniel |
| 7,622,367 B1 | 11/2009 | Nuzzo |
| 7,727,228 B2 | 6/2010 | Abboud |
| 7,739,791 B2 | 6/2010 | Brandenburg |
| 7,759,167 B2 | 7/2010 | Vanfleteren |
| 7,815,095 B2 | 10/2010 | Fujisawa |
| 7,960,246 B2 | 6/2011 | Flamand |
| 7,982,296 B2 | 7/2011 | Nuzzo |
| 8,097,926 B2 | 1/2012 | De Graff |
| 8,198,621 B2 | 6/2012 | Rogers |
| 8,207,473 B2 | 6/2012 | Axisa |
| 8,217,381 B2 | 7/2012 | Rogers |
| 8,332,053 B1 | 12/2012 | Patterson |
| 8,372,726 B2 | 2/2013 | De Graff |
| 8,389,862 B2 | 3/2013 | Arora |
| 8,431,828 B2 | 4/2013 | Vanfleteren |
| 8,440,546 B2 | 5/2013 | Nuzzo |
| 8,536,667 B2 | 9/2013 | De Graff |
| 8,552,299 B2 | 10/2013 | Rogers |
| 8,609,471 B2 | 12/2013 | Xu |
| 8,618,656 B2 | 12/2013 | Oh |
| 8,664,699 B2 | 3/2014 | Nuzzo |
| 8,679,888 B2 | 3/2014 | Rogers |
| 8,729,524 B2 | 5/2014 | Rogers |
| 8,754,396 B2 | 6/2014 | Rogers |
| 8,865,489 B2 | 10/2014 | Rogers |
| 8,886,334 B2 | 11/2014 | Ghaffari |
| 8,905,772 B2 | 12/2014 | Rogers |
| 9,012,784 B2 | 4/2015 | Arora |
| 9,082,025 B2 | 7/2015 | Fastert |
| 9,105,555 B2 | 8/2015 | Rogers |
| 9,105,782 B2 | 8/2015 | Rogers |
| 9,107,592 B2 | 8/2015 | Litt |
| 9,119,533 B2 | 9/2015 | Ghaffari |
| 9,123,614 B2 | 9/2015 | Graff |
| 9,133,024 B2 | 9/2015 | Phan |
| 9,159,635 B2 | 10/2015 | Elolampi |
| 9,168,094 B2 | 10/2015 | Lee |
| 9,171,794 B2 | 10/2015 | Rafferty |
| 9,186,060 B2 | 11/2015 | De Graff |
| 9,226,402 B2 | 12/2015 | Hsu |
| 9,247,637 B2 | 1/2016 | Hsu |
| 9,289,132 B2 | 3/2016 | Ghaffari |
| 9,295,842 B2 | 3/2016 | Ghaffari |
| 9,320,907 B2 | 4/2016 | Bogie |
| 9,324,733 B2 | 4/2016 | Rogers |
| 9,372,123 B2 | 6/2016 | Li |
| 9,408,305 B2 | 8/2016 | Hsu |
| 9,420,953 B2 | 8/2016 | Litt |
| 9,450,043 B2 | 9/2016 | Nuzzo |
| 9,515,025 B2 | 12/2016 | Rogers |
| 9,516,758 B2 | 12/2016 | Arora |
| 9,545,216 B2 | 1/2017 | D'Angelo |
| 9,545,285 B2 | 1/2017 | Ghaffari |
| 9,554,850 B2 | 1/2017 | Lee |
| 9,579,040 B2 | 2/2017 | Rafferty |
| 9,583,428 B2 | 2/2017 | Rafferty |
| D781,270 S | 3/2017 | Li |
| 9,622,680 B2 | 4/2017 | Ghaffari |
| 9,629,586 B2 | 4/2017 | Ghaffari |
| 9,647,171 B2 | 5/2017 | Rogers |
| 9,655,560 B2 | 5/2017 | Ghaffari |
| 9,662,069 B2 | 5/2017 | De Graff |
| 9,702,839 B2 | 7/2017 | Ghaffari |
| 9,704,908 B2 | 7/2017 | De Graff |
| 9,706,647 B2 | 7/2017 | Hsu |
| 9,723,122 B2 | 8/2017 | Ghaffari |
| 9,723,711 B2 | 8/2017 | Elolampi |
| 9,750,421 B2 | 9/2017 | Ghaffari |
| 9,757,050 B2 | 9/2017 | Ghaffari |
| 9,761,444 B2 | 9/2017 | Nuzzo |
| 9,768,086 B2 | 9/2017 | Nuzzo |
| 9,801,557 B2 | 10/2017 | Ghaffari |
| 9,844,145 B2 | 10/2017 | Hsu |
| 9,810,623 B2 | 11/2017 | Ghaffari |
| 9,833,190 B2 | 12/2017 | Ghaffari |
| 9,839,367 B2 | 12/2017 | Litt |
| 9,846,829 B2 | 12/2017 | Fastert |
| 9,894,757 B2 | 2/2018 | Arora |
| 9,899,330 B2 | 2/2018 | Dalal |
| 9,949,691 B2 | 4/2018 | Huppert |

(56) References Cited

U.S. PATENT DOCUMENTS

| | | |
|---|---|---|
| 10,032,709 B2 | 7/2018 | Rafferty |
| D825,537 S | 8/2018 | Li |
| 10,064,269 B2 | 8/2018 | Rogers |
| 10,186,546 B2 | 1/2019 | De Graff |
| 2001/0012918 A1 | 8/2001 | Swanson |
| 2001/0021867 A1 | 9/2001 | Kordis |
| 2001/0043513 A1 | 11/2001 | Grupp |
| 2002/0000813 A1 | 1/2002 | Hirono |
| 2002/0026127 A1 | 2/2002 | Balbierz |
| 2002/0060633 A1 | 5/2002 | Crisco, III |
| 2002/0077534 A1 | 6/2002 | Durousseau |
| 2002/0079572 A1 | 6/2002 | Khan |
| 2002/0082515 A1 | 6/2002 | Campbell |
| 2002/0094701 A1 | 7/2002 | Biegelsen |
| 2002/0107436 A1 | 8/2002 | Barton |
| 2002/0113739 A1 | 8/2002 | Howard |
| 2002/0128700 A1 | 9/2002 | Cross, Jr. |
| 2002/0145467 A1 | 10/2002 | Minch |
| 2002/0151934 A1 | 10/2002 | Levine |
| 2002/0158330 A1 | 10/2002 | Moon |
| 2002/0173730 A1 | 11/2002 | Pottgen |
| 2002/0193724 A1 | 12/2002 | Stebbings |
| 2003/0017848 A1 | 1/2003 | Engstrom |
| 2003/0045025 A1 | 3/2003 | Coyle |
| 2003/0097165 A1 | 5/2003 | Krulevitch |
| 2003/0120271 A1 | 6/2003 | Burnside |
| 2003/0162507 A1 | 8/2003 | Vatt |
| 2003/0214408 A1 | 11/2003 | Grajales |
| 2003/0236455 A1 | 12/2003 | Swanson |
| 2004/0006264 A1 | 1/2004 | Mojarradi |
| 2004/0085469 A1 | 5/2004 | Johnson |
| 2004/0092806 A1 | 5/2004 | Sagon |
| 2004/0106334 A1 | 6/2004 | Suzuki |
| 2004/0118831 A1 | 6/2004 | Martin |
| 2004/0135094 A1 | 7/2004 | Niigaki |
| 2004/0138558 A1 | 7/2004 | Dunki-Jacobs |
| 2004/0149921 A1 | 8/2004 | Smyk |
| 2004/0178466 A1 | 9/2004 | Merrill |
| 2004/0192082 A1 | 9/2004 | Wagner |
| 2004/0201134 A1 | 10/2004 | Kawai |
| 2004/0203486 A1 | 10/2004 | Shepherd |
| 2004/0221370 A1 | 11/2004 | Hannula |
| 2004/0238819 A1 | 12/2004 | Maghribi |
| 2004/0243204 A1 | 12/2004 | Maghribi |
| 2005/0021103 A1 | 1/2005 | DiLorenzo |
| 2005/0029680 A1 | 2/2005 | Jung |
| 2005/0030408 A1 | 2/2005 | Ito |
| 2005/0065486 A1 | 3/2005 | Fattman |
| 2005/0067293 A1 | 3/2005 | Naito |
| 2005/0070778 A1 | 3/2005 | Lackey |
| 2005/0096513 A1 | 5/2005 | Ozguz |
| 2005/0113744 A1 | 5/2005 | Donoghue |
| 2005/0139683 A1 | 6/2005 | Yi |
| 2005/0171524 A1 | 8/2005 | Stern |
| 2005/0203366 A1 | 9/2005 | Donoghue |
| 2005/0204811 A1 | 9/2005 | Neff |
| 2005/0248312 A1 | 11/2005 | Cao |
| 2005/0261617 A1 | 11/2005 | Hall |
| 2005/0258050 A1 | 12/2005 | Bruce |
| 2005/0285262 A1 | 12/2005 | Knapp |
| 2006/0003709 A1 | 1/2006 | Wood |
| 2006/0009700 A1 | 1/2006 | Brumfield |
| 2006/0038182 A1 | 2/2006 | Rogers |
| 2006/0071349 A1 | 4/2006 | Tokushige |
| 2006/0084394 A1 | 4/2006 | Engstrom |
| 2006/0106321 A1 | 5/2006 | Lewinsky |
| 2006/0122298 A1 | 6/2006 | Menon |
| 2006/0128346 A1 | 6/2006 | Yasui |
| 2006/0154398 A1 | 7/2006 | Qing |
| 2006/0160560 A1 | 7/2006 | Josenhans |
| 2006/0235314 A1 | 10/2006 | Migliuolo |
| 2006/0248946 A1 | 11/2006 | Howell |
| 2006/0257945 A1 | 11/2006 | Masters |
| 2006/0264767 A1 | 11/2006 | Shennib |
| 2006/0270135 A1 | 11/2006 | Chrysler |
| 2006/0276702 A1 | 12/2006 | McGinnis |
| 2006/0286785 A1 | 12/2006 | Rogers |
| 2007/0027374 A1 | 2/2007 | Wihlborg |
| 2007/0027514 A1 | 2/2007 | Gerber |
| 2007/0031283 A1 | 2/2007 | Davis |
| 2007/0069894 A1 | 3/2007 | Lee |
| 2007/0083079 A1 | 4/2007 | Lee |
| 2007/0108389 A1 | 5/2007 | Makela |
| 2007/0113399 A1 | 5/2007 | Kumar |
| 2007/0123756 A1 | 5/2007 | Kitajima |
| 2007/0139451 A1 | 6/2007 | Somasiri |
| 2007/0151358 A1 | 7/2007 | Chien |
| 2007/0179373 A1 | 8/2007 | Pronovost |
| 2007/0190880 A1 | 8/2007 | Dubrow |
| 2007/0196957 A1 | 8/2007 | Akutagawa |
| 2007/0215890 A1 | 9/2007 | Harbers |
| 2007/0270672 A1 | 11/2007 | Hayter |
| 2007/0270674 A1 | 11/2007 | Kane |
| 2008/0036097 A1 | 2/2008 | Ito |
| 2008/0046080 A1 | 2/2008 | Vanden Bulcke |
| 2008/0074383 A1 | 3/2008 | Dean |
| 2008/0091089 A1 | 4/2008 | Guillory |
| 2008/0096620 A1 | 4/2008 | Lee |
| 2008/0139894 A1 | 6/2008 | Szydlo-Moore |
| 2008/0157235 A1 | 7/2008 | Rogers |
| 2008/0185534 A1 | 8/2008 | Simon |
| 2008/0188912 A1 | 8/2008 | Stone |
| 2008/0190202 A1 | 8/2008 | Kulach |
| 2008/0193749 A1 | 8/2008 | Thompson |
| 2008/0200973 A1 | 8/2008 | Mallozzi |
| 2008/0204021 A1 | 8/2008 | Leussler |
| 2008/0211087 A1 | 9/2008 | Mueller-Hipper |
| 2008/0237840 A1 | 10/2008 | Alcoe |
| 2008/0259576 A1 | 10/2008 | Johnson |
| 2008/0262381 A1 | 10/2008 | Kolen |
| 2008/0275327 A1 | 11/2008 | Faarbaek |
| 2008/0287167 A1 | 11/2008 | Caine |
| 2008/0297350 A1 | 12/2008 | Iwasa |
| 2008/0309807 A1 | 12/2008 | Kinoshita |
| 2008/0313552 A1 | 12/2008 | Buehler |
| 2009/0000377 A1 | 1/2009 | Shipps |
| 2009/0001550 A1 | 1/2009 | Li |
| 2009/0015560 A1 | 1/2009 | Robinson |
| 2009/0017884 A1 | 1/2009 | Rotschild |
| 2009/0048556 A1 | 2/2009 | Durand |
| 2009/0076363 A1 | 3/2009 | Bly |
| 2009/0088750 A1 | 4/2009 | Hushka |
| 2009/0107704 A1 | 4/2009 | Vanfleteren |
| 2009/0154736 A1 | 6/2009 | Lee |
| 2009/0184254 A1 | 7/2009 | Miura |
| 2009/0204168 A1 | 8/2009 | Kallmeyer |
| 2009/0215385 A1 | 8/2009 | Waters |
| 2009/0225751 A1 | 9/2009 | Koenck |
| 2009/0261828 A1 | 10/2009 | Nordmeyer-Massner |
| 2009/0273909 A1 | 11/2009 | Shin |
| 2009/0283891 A1 | 11/2009 | Dekker |
| 2009/0291508 A1 | 11/2009 | Babu |
| 2009/0294803 A1 | 12/2009 | Nuzzo |
| 2009/0317639 A1 | 12/2009 | Axisa |
| 2009/0322480 A1 | 12/2009 | Benedict |
| 2010/0002402 A1 | 1/2010 | Rogers |
| 2010/0030167 A1 | 2/2010 | Thirstrup |
| 2010/0036211 A1 | 2/2010 | La Rue |
| 2010/0041966 A1 | 2/2010 | Kang |
| 2010/0059863 A1 | 3/2010 | Rogers |
| 2010/0072577 A1 | 3/2010 | Nuzzo |
| 2010/0073669 A1 | 3/2010 | Colvin |
| 2010/0087782 A1 | 4/2010 | Ghaffari |
| 2010/0090781 A1 | 4/2010 | Yamamoto |
| 2010/0090824 A1 | 4/2010 | Rowell |
| 2010/0116526 A1 | 5/2010 | Arora |
| 2010/0117660 A1 | 5/2010 | Douglas |
| 2010/0245011 A1 | 9/2010 | Chatzopoulos |
| 2010/0254092 A1 | 10/2010 | Dong |
| 2010/0271191 A1 | 10/2010 | De Graff |
| 2010/0298895 A1 | 11/2010 | Ghaffari |
| 2010/0317132 A1 | 12/2010 | Rogers |
| 2010/0321161 A1 | 12/2010 | Isabell |
| 2010/0327387 A1 | 12/2010 | Kasai |

(56) References Cited

U.S. PATENT DOCUMENTS

| | | |
|---|---|---|
| 2011/0011179 A1 | 1/2011 | Gustafsson |
| 2011/0019370 A1 | 1/2011 | Koh |
| 2011/0019371 A1 | 1/2011 | Koh |
| 2011/0034760 A1 | 2/2011 | Brynelsen |
| 2011/0034912 A1 | 2/2011 | De Graff |
| 2011/0051384 A1 | 3/2011 | Kriechbaum |
| 2011/0054583 A1 | 3/2011 | Litt |
| 2011/0071603 A1 | 3/2011 | Moore |
| 2011/0098583 A1 | 4/2011 | Pandia |
| 2011/0101789 A1 | 5/2011 | Salter |
| 2011/0121822 A1 | 5/2011 | Parsche |
| 2011/0136436 A1 | 6/2011 | Hoyt |
| 2011/0140856 A1 | 6/2011 | Downie |
| 2011/0140897 A1 | 6/2011 | Purks |
| 2011/0175735 A1 | 7/2011 | Forster |
| 2011/0184320 A1 | 7/2011 | Shipps |
| 2011/0185611 A1 | 8/2011 | Adams |
| 2011/0193105 A1 | 8/2011 | Lerman |
| 2011/0213559 A1 | 9/2011 | Pollack |
| 2011/0215931 A1 | 9/2011 | Callsen |
| 2011/0218756 A1 | 9/2011 | Callsen |
| 2011/0218757 A1 | 9/2011 | Callsen |
| 2011/0220890 A1 | 9/2011 | Nuzzo |
| 2011/0221580 A1 | 9/2011 | Marsanne |
| 2011/0222375 A1 | 9/2011 | Tsubata |
| 2011/0263950 A1 | 10/2011 | Larson |
| 2011/0270049 A1 | 11/2011 | Katra |
| 2011/0277813 A1 | 11/2011 | Rogers |
| 2011/0284268 A1 | 11/2011 | Palaniswamy |
| 2011/0306851 A1 | 12/2011 | Wang |
| 2011/0317737 A1 | 12/2011 | Klewer |
| 2012/0016258 A1 | 1/2012 | Webster |
| 2012/0028575 A1 | 2/2012 | Chen |
| 2012/0051005 A1 | 3/2012 | Vanfleteren |
| 2012/0052268 A1 | 3/2012 | Axisa |
| 2012/0065937 A1 | 3/2012 | De Graff |
| 2012/0068848 A1 | 3/2012 | Campbell |
| 2012/0074546 A1 | 3/2012 | Chong |
| 2012/0087216 A1 | 4/2012 | Keung |
| 2012/0091594 A1 | 4/2012 | Landesberger |
| 2012/0092178 A1 | 4/2012 | Callsen |
| 2012/0092222 A1 | 4/2012 | Kato |
| 2012/0101413 A1 | 4/2012 | Beetel |
| 2012/0101538 A1 | 4/2012 | Ballakur |
| 2012/0108012 A1 | 5/2012 | Yasuda |
| 2012/0116382 A1 | 5/2012 | Ku |
| 2012/0126418 A1 | 5/2012 | Feng |
| 2012/0150072 A1 | 6/2012 | Revol-Cavalier |
| 2012/0150074 A1 | 6/2012 | Yanev |
| 2012/0157804 A1 | 6/2012 | Rogers |
| 2012/0165759 A1 | 6/2012 | Rogers |
| 2012/0172697 A1 | 7/2012 | Urman |
| 2012/0178367 A1 | 7/2012 | Matsumoto |
| 2012/0179075 A1 | 7/2012 | Perry |
| 2012/0206097 A1 | 8/2012 | Scar |
| 2012/0215127 A1 | 8/2012 | Shikida |
| 2012/0220835 A1 | 8/2012 | Chung |
| 2012/0245444 A1 | 9/2012 | Otis |
| 2012/0256308 A1 | 10/2012 | Helin |
| 2012/0256492 A1 | 10/2012 | Song |
| 2012/0314382 A1 | 12/2012 | Wesselmann |
| 2012/0316455 A1 | 12/2012 | Rahman |
| 2012/0327608 A1 | 12/2012 | Rogers |
| 2013/0035751 A1 | 2/2013 | Shalev |
| 2013/0041235 A1 | 2/2013 | Rogers |
| 2013/0044215 A1 | 2/2013 | Rothkopf |
| 2013/0066365 A1 | 3/2013 | Belson |
| 2013/0079693 A1 | 3/2013 | Ranky |
| 2013/0085552 A1 | 4/2013 | Mandel |
| 2013/0099358 A1 | 4/2013 | Elolampi |
| 2013/0100618 A1 | 4/2013 | Rogers |
| 2013/0116520 A1 | 5/2013 | Roham |
| 2013/0118255 A1 | 5/2013 | Callsen |
| 2013/0123587 A1 | 5/2013 | Sarrafzadeh |
| 2013/0131660 A1 | 5/2013 | Monson |
| 2013/0147063 A1 | 6/2013 | Park |
| 2013/0185003 A1 | 7/2013 | Carbeck |
| 2013/0192356 A1 | 8/2013 | De Graff |
| 2013/0197319 A1 | 8/2013 | Monty |
| 2013/0200268 A1 | 8/2013 | Rafferty |
| 2013/0211322 A1* | 8/2013 | Degen ............. A61M 1/285 604/29 |
| 2013/0211761 A1 | 8/2013 | Brandsma |
| 2013/0214300 A1 | 8/2013 | Lerman |
| 2013/0215467 A1 | 8/2013 | Fein |
| 2013/0237150 A1 | 9/2013 | Royston |
| 2013/0245387 A1 | 9/2013 | Patel |
| 2013/0245388 A1 | 9/2013 | Rafferty |
| 2013/0253285 A1 | 9/2013 | Bly |
| 2013/0261415 A1 | 10/2013 | Ashe |
| 2013/0261464 A1 | 10/2013 | Singh |
| 2013/0285836 A1 | 10/2013 | Proud |
| 2013/0313713 A1 | 11/2013 | Arora |
| 2013/0316442 A1 | 11/2013 | Meurville |
| 2013/0316487 A1 | 11/2013 | De Graff |
| 2013/0316645 A1 | 11/2013 | Li |
| 2013/0320503 A1 | 12/2013 | Nuzzo |
| 2013/0321373 A1 | 12/2013 | Yoshizumi |
| 2013/0325357 A1 | 12/2013 | Walerow |
| 2013/0328219 A1 | 12/2013 | Chau |
| 2013/0331914 A1 | 12/2013 | Lee |
| 2013/0335011 A1 | 12/2013 | Bohringer |
| 2014/0001058 A1 | 1/2014 | Ghaffari |
| 2014/0002242 A1 | 1/2014 | Fenkanyn |
| 2014/0012160 A1 | 1/2014 | Ghaffari |
| 2014/0012242 A1 | 1/2014 | Lee |
| 2014/0022746 A1 | 1/2014 | Hsu |
| 2014/0039290 A1 | 2/2014 | De Graff |
| 2014/0097944 A1 | 4/2014 | Fastert |
| 2014/0110859 A1 | 4/2014 | Rafferty |
| 2014/0125458 A1 | 5/2014 | Bachman |
| 2014/0140020 A1 | 5/2014 | Rogers |
| 2014/0188426 A1 | 7/2014 | Fastert |
| 2014/0191236 A1 | 7/2014 | Nuzzo |
| 2014/0206976 A1 | 7/2014 | Thompson |
| 2014/0216524 A1 | 8/2014 | Rogers |
| 2014/0275835 A1 | 9/2014 | Lamego |
| 2014/0303452 A1 | 10/2014 | Ghaffari |
| 2014/0303520 A1 | 10/2014 | Telfort |
| 2014/0303680 A1 | 10/2014 | Donnelly |
| 2014/0308930 A1 | 10/2014 | Tran |
| 2014/0316191 A1 | 10/2014 | De Zambotti |
| 2014/0340857 A1 | 11/2014 | Hsu |
| 2014/0342174 A1 | 11/2014 | Tominaga |
| 2014/0350883 A1 | 11/2014 | Carter |
| 2014/0371547 A1 | 12/2014 | Gartenberg |
| 2014/0371823 A1 | 12/2014 | Mashiach |
| 2014/0374872 A1 | 12/2014 | Rogers |
| 2014/0375465 A1 | 12/2014 | Fenuccio |
| 2015/0001462 A1 | 1/2015 | Rogers |
| 2015/0019135 A1 | 1/2015 | Kacyvenski |
| 2015/0025394 A1 | 1/2015 | Hong |
| 2015/0035743 A1 | 2/2015 | Rosener |
| 2015/0100135 A1 | 4/2015 | Ives |
| 2015/0116814 A1 | 4/2015 | Takakura |
| 2015/0126878 A1 | 5/2015 | An |
| 2015/0150505 A1 | 6/2015 | Kaskoun |
| 2015/0161342 A1* | 6/2015 | Takakura ............. G06F 19/3418 705/2 |
| 2015/0164377 A1 | 6/2015 | Nathan |
| 2015/0178806 A1 | 6/2015 | Nuzzo |
| 2015/0181700 A1 | 6/2015 | Rogers |
| 2015/0194817 A1 | 7/2015 | Lee |
| 2015/0237711 A1 | 8/2015 | Rogers |
| 2015/0241288 A1 | 8/2015 | Keen |
| 2015/0248833 A1 | 9/2015 | Arne |
| 2015/0272652 A1 | 10/2015 | Ghaffari |
| 2015/0335254 A1 | 11/2015 | Fastert |
| 2015/0359469 A1 | 12/2015 | Jacobs |
| 2015/0371511 A1 | 12/2015 | Miller |
| 2015/0373487 A1 | 12/2015 | Miller |
| 2016/0006123 A1 | 1/2016 | Li |
| 2016/0015962 A1 | 1/2016 | Shokoueinejad Maragheh |
| 2016/0037478 A1 | 2/2016 | Skaaksrud |

(56) References Cited

U.S. PATENT DOCUMENTS

| | | | |
|---|---|---|---|
| 2016/0058324 A1* | 3/2016 | Cao | A61B 5/7282 600/302 |
| 2016/0058380 A1 | 3/2016 | Lee | |
| 2016/0066854 A1 | 3/2016 | Mei | |
| 2016/0086909 A1 | 3/2016 | Garlock | |
| 2016/0095652 A1 | 4/2016 | Lee | |
| 2016/0099214 A1 | 4/2016 | Dalal | |
| 2016/0099227 A1 | 4/2016 | Dalal | |
| 2016/0111353 A1 | 4/2016 | Rafferty | |
| 2016/0135740 A1 | 5/2016 | Ghaffari | |
| 2016/0178251 A1 | 6/2016 | Johnson | |
| 2016/0213262 A1 | 7/2016 | Ghaffari | |
| 2016/0213424 A1 | 7/2016 | Ghaffari | |
| 2016/0228640 A1 | 8/2016 | Pindado | |
| 2016/0232807 A1 | 8/2016 | Ghaffari | |
| 2016/0240061 A1 | 8/2016 | Li | |
| 2016/0249174 A1 | 8/2016 | Patel | |
| 2016/0256070 A1 | 9/2016 | Murphy | |
| 2016/0261151 A1* | 9/2016 | Kim | H02J 50/80 |
| 2016/0271290 A1 | 9/2016 | Humayun | |
| 2016/0284544 A1 | 9/2016 | Nuzzo | |
| 2016/0287177 A1 | 10/2016 | Huppert | |
| 2016/0293794 A1 | 10/2016 | Nuzzo | |
| 2016/0309594 A1 | 10/2016 | Hsu | |
| 2016/0322283 A1 | 11/2016 | McMahon | |
| 2016/0331232 A1* | 11/2016 | Love | A61B 5/002 |
| 2016/0336804 A1* | 11/2016 | Son | H02J 7/0027 |
| 2016/0338646 A1 | 11/2016 | Lee | |
| 2016/0361015 A1 | 12/2016 | Wang | |
| 2016/0371957 A1 | 12/2016 | Ghaffari | |
| 2016/0381789 A1 | 12/2016 | Rogers | |
| 2017/0011210 A1* | 1/2017 | Cheong | H04W 12/06 |
| 2017/0019988 A1 | 1/2017 | McGrane | |
| 2017/0049397 A1 | 2/2017 | Sun | |
| 2017/0071491 A1 | 3/2017 | Litt | |
| 2017/0079588 A1 | 3/2017 | Ghaffari | |
| 2017/0079589 A1 | 3/2017 | Ghaffari | |
| 2017/0083312 A1 | 3/2017 | Pindado | |
| 2017/0086747 A1 | 3/2017 | Ghaffari | |
| 2017/0086748 A1 | 3/2017 | Ghaffari | |
| 2017/0086749 A1 | 3/2017 | Ghaffari | |
| 2017/0095670 A1 | 4/2017 | Ghaffari | |
| 2017/0095732 A1 | 4/2017 | Ghaffari | |
| 2017/0105795 A1 | 4/2017 | Lee | |
| 2017/0110417 A1 | 4/2017 | Arora | |
| 2017/0164865 A1 | 6/2017 | Rafferty | |
| 2017/0164866 A1 | 6/2017 | Rafferty | |
| 2017/0181659 A1 | 6/2017 | Rafferty | |
| 2017/0186727 A1 | 6/2017 | Dalal | |
| 2017/0188942 A1 | 7/2017 | Ghaffari | |
| 2017/0200670 A1 | 7/2017 | Rafferty | |
| 2017/0200679 A1 | 7/2017 | Rogers | |
| 2017/0200707 A1 | 7/2017 | Rogers | |
| 2017/0223846 A1 | 8/2017 | Elolampi | |
| 2017/0244285 A1 | 8/2017 | Raj | |
| 2017/0244543 A1 | 8/2017 | Raj | |
| 2017/0296114 A1 | 10/2017 | Ghaffari | |
| 2017/0331524 A1 | 11/2017 | Aranyosi | |
| 2017/0340236 A1 | 11/2017 | Ghaffari | |
| 2018/0076336 A1 | 3/2018 | Graff | |
| 2018/0111353 A1 | 4/2018 | Huppert | |
| 2018/0159361 A1* | 6/2018 | Cong | H02J 7/007 |
| 2018/0190704 A1 | 7/2018 | Graff | |
| 2018/0192918 A1 | 7/2018 | Ives | |
| 2018/0199884 A1 | 7/2018 | Huppert | |
| 2018/0205417 A1 | 7/2018 | Raj | |
| 2018/0293472 A1 | 10/2018 | Fastert | |
| 2018/0302980 A1 | 10/2018 | Arora | |
| 2018/0302988 A1 | 10/2018 | Hsu | |
| 2018/0308799 A1 | 10/2018 | Dalal | |

FOREIGN PATENT DOCUMENTS

| | | |
|---|---|---|
| CN | 102772246 A | 11/2012 |
| CN | 103165478 A | 6/2013 |
| CN | 103313671 A | 9/2013 |
| CN | 103619590 A | 3/2014 |
| DE | 10 2006 011 596 A1 | 9/2007 |
| DE | 10 2006 051 745 a1 | 5/2008 |
| DE | 10 2007 046 886 A1 | 4/2009 |
| DE | 10 2008 044 902 A1 | 3/2010 |
| EP | 0526855 A1 | 2/1993 |
| EP | 0585670 A2 | 3/1994 |
| EP | 0779059 A1 | 6/1997 |
| EP | 0952542 A1 | 10/1999 |
| EP | 1100296 A1 | 5/2001 |
| EP | 1808124 A2 | 7/2007 |
| EP | 2259062 A2 | 12/2010 |
| EP | 2498196 A2 | 9/2012 |
| EP | 2541995 A1 | 1/2013 |
| JP | H 04-290489 A | 10/1992 |
| JP | 05-087511 A | 4/1993 |
| JP | H 05-102228 A | 4/1993 |
| JP | 9-201338 A | 8/1997 |
| JP | H10-155753 A | 6/1998 |
| JP | 03-218797 B2 | 10/2001 |
| JP | 2002-90479 A | 3/2002 |
| JP | 2002-263185 A | 9/2002 |
| JP | 2003-046291 A | 2/2003 |
| JP | 2005-052212 A | 3/2005 |
| JP | 2006-520657 A | 9/2006 |
| JP | 2006-523127 A | 10/2006 |
| JP | 2007-042829 A | 2/2007 |
| JP | 2007-502136 A | 2/2007 |
| JP | 2008-194323 A | 8/2008 |
| JP | 2009-150590 A | 7/2009 |
| JP | 2009-158839 A | 7/2009 |
| JP | 2009-170173 A | 7/2009 |
| JP | 2011-082050 A | 4/2011 |
| JP | 2011-103914 A | 6/2011 |
| JP | 2011-122732 A | 6/2011 |
| JP | 2012-134272 A | 7/2012 |
| JP | 2012-515436 A | 7/2012 |
| JP | 2013-089959 A | 5/2013 |
| JP | 2013-128060 A | 6/2013 |
| JP | 2013-130384 A | 7/2013 |
| JP | 2013-536592 A | 9/2013 |
| WO | WO 1999/038211 A2 | 7/1999 |
| WO | WO 2002/047162 A2 | 6/2002 |
| WO | WO 2003/021679 A2 | 3/2003 |
| WO | WO 2004/084720 A2 | 10/2004 |
| WO | WO 2005/083546 A1 | 9/2005 |
| WO | WO 2005/122285 A2 | 12/2005 |
| WO | WO 2006/013573 A2 | 2/2006 |
| WO | WO 2007/003019 A2 | 1/2007 |
| WO | WO 2007/024983 A2 | 3/2007 |
| WO | WO 2007/116344 A1 | 10/2007 |
| WO | WO 2007/136726 A2 | 11/2007 |
| WO | WO 2008/030960 A2 | 3/2008 |
| WO | WO 2008/055212 A2 | 5/2008 |
| WO | WO 2008/143635 A1 | 11/2008 |
| WO | WO 2009/036260 A1 | 3/2009 |
| WO | WO 2009/111641 A1 | 9/2009 |
| WO | WO 2009/114689 A1 | 9/2009 |
| WO | WO 2010/029966 A1 | 3/2010 |
| WO | WO 2010/036807 A1 | 4/2010 |
| WO | WO 2010/042653 A1 | 4/2010 |
| WO | WO 2010/042957 A2 | 4/2010 |
| WO | WO 2010/046883 A1 | 4/2010 |
| WO | WO 2010/056857 A2 | 5/2010 |
| WO | WO 2010/081137 A2 | 7/2010 |
| WO | WO 2010/082993 A2 | 7/2010 |
| WO | WO 2010/102310 A2 | 9/2010 |
| WO | WO 2010/132552 A1 | 11/2010 |
| WO | WO 2011/003181 A1 | 1/2011 |
| WO | WO 2011/041727 A1 | 4/2011 |
| WO | WO 2011/084450 A1 | 7/2011 |
| WO | WO 2011/084709 A2 | 7/2011 |
| WO | WO 2011/124898 A1 | 10/2011 |
| WO | WO 2011/127331 A2 | 10/2011 |

(56) References Cited

FOREIGN PATENT DOCUMENTS

| WO | WO 2012/094264 A2 | 7/2012 |
|---|---|---|
| WO | WO 2012/125494 A2 | 9/2012 |
| WO | WO 2012/166686 A2 | 12/2012 |
| WO | WO 2013/010171 A1 | 1/2013 |
| WO | WO 2013/022853 A1 | 2/2013 |
| WO | WO 2013/033724 A1 | 3/2013 |
| WO | WO 2013/034987 A3 | 3/2013 |
| WO | WO 2013/049716 A1 | 4/2013 |
| WO | WO 2013/052919 A2 | 4/2013 |
| WO | WO 2013/059671 A1 | 4/2013 |
| WO | WO 2013/063634 A1 | 5/2013 |
| WO | WO 2013/144738 A2 | 10/2013 |
| WO | WO 2013/144866 A1 | 10/2013 |
| WO | WO 2013/170032 A2 | 11/2013 |
| WO | WO 2014/007871 A1 | 1/2014 |
| WO | WO 2014/058473 A1 | 4/2014 |
| WO | WO 2014/059032 A1 | 4/2014 |
| WO | WO 2014/106041 A1 | 7/2014 |
| WO | WO 2014/110176 A1 | 7/2014 |
| WO | WO 2014/124044 A1 | 8/2014 |
| WO | WO 2014/124049 A2 | 8/2014 |
| WO | WO 2014/130928 A2 | 8/2014 |
| WO | WO 2014/130931 A1 | 8/2014 |
| WO | WO 2014/179343 A1 | 11/2014 |
| WO | WO 2014/186467 A2 | 11/2014 |
| WO | WO 2014/197443 A1 | 12/2014 |
| WO | WO 2014/205434 A2 | 12/2014 |
| WO | WO 2015/021039 A1 | 2/2015 |
| WO | WO 2015/054312 A1 | 4/2015 |
| WO | WO 2015/077559 A1 | 5/2015 |
| WO | WO 2015/080991 A1 | 6/2015 |
| WO | WO 2015/102951 A2 | 7/2015 |
| WO | WO 2015/103483 A1 | 7/2015 |
| WO | WO 2015/103580 A2 | 7/2015 |
| WO | WO 2015/127458 A1 | 8/2015 |
| WO | WO 2015/134588 A1 | 9/2015 |
| WO | WO 2015/138712 A1 | 9/2015 |
| WO | WO 2015/145471 A1 | 10/2015 |
| WO | WO 2015/159280 A1 | 10/2015 |
| WO | WO 2016/010983 A1 | 1/2016 |
| WO | WO 2016/025430 A1 | 2/2016 |
| WO | WO 2016/048888 A1 | 3/2016 |
| WO | WO 2016/054512 A1 | 4/2016 |
| WO | WO 2016/057318 A1 | 4/2016 |
| WO | WO 2016/081244 A1 | 5/2016 |
| WO | WO 2016/0127050 A1 | 8/2016 |
| WO | WO 2016/134306 A1 | 8/2016 |
| WO | WO 2016-140961 A1 | 9/2016 |
| WO | WO 2016/205385 A1 | 12/2016 |
| WO | WO 2017/015000 A1 | 1/2017 |
| WO | WO 2017/059215 A1 | 4/2017 |
| WO | WO 2017/062508 A1 | 4/2017 |
| WO | WO 2017/184705 A1 | 10/2017 |
| WO | WO 2018/013569 A1 | 1/2018 |
| WO | WO 2018/013656 A1 | 1/2018 |
| WO | WO 2018/057911 A1 | 3/2018 |
| WO | WO 2018/081778 A1 | 5/2018 |
| WO | WO 2018/085336 A1 | 5/2018 |
| WO | WO 2018/093751 A1 | 5/2018 |
| WO | WO 2018/119193 A1 | 6/2018 |
| WO | WO 2018/136462 A1 | 7/2018 |
| WO | WO 2018/208523 A1 | 11/2018 |

OTHER PUBLICATIONS

Demura et al., "Immobilization of Glucose Oxidase with *Bombyx mori* Silk Fibroin by Only Stretching Treatment and its Application to Glucose Sensor," Biotechnology and Bioengineering, vol. 33, 598-603 (6 pages) (1989).

Ellerbee et al., "Quantifying Colorimetric Assays in Paper-Based Microfluidic Devices by Measuring the Transmission of Light through Paper," Analytical Chemistry, vol. 81, No. 20 8447-8452, (6 pages) (Oct. 15, 2009).

Halsted, "Ligature and Suture Material," Journal of the American Medical Association, vol. LX, No. 15, 1119-1126, (8 pages) (Apr. 12, 1913).

Kim et al., "Complementary Metal Oxide Silicon Integrated Circuits Incorporating Monolithically Integrated Stretchable Wavy Interconnects," Applied Physics Letters, vol. 93, 044102-044102.3 (3 pages) (Jul. 31, 2008).

Kim et al., "Dissolvable Films of Silk Fibroin for Ultrathin Conformal Bio-Integrated Electronics," Nature, 1-8 (8 pages) (Apr. 18, 2010).

Kim et al., "Materials and Noncoplanar Mesh Designs for Integrated Circuits with Linear Elastic Responses to Extreme Mechanical Deformations," PNAS, vol. 105, No. 48, 18675-18680 (6 pages) (Dec. 2, 2008).

Kim et al., "Stretchable and Foldable Silicon Integrated Circuits," Science, vol. 320, 507-511 (5 pages) (Apr. 25, 2008).

Kim et al., "Electrowetting on Paper for Electronic Paper Display," ACS Applied Materials & Interfaces, vol. 2, No. 11, (3318-3323) (6 pages) (Nov. 24, 2010).

Ko et al., "A Hemispherical Electronic Eye Camera Based on Compressible Silicon Optoelectronics," Nature, vol. 454, 748-753 (6 pages) (Aug. 7, 2008).

Lawrence et al., "Bioactive Silk Protein Biomaterial Systems for Optical Devices," Biomacromolecules, vol. 9, 1214-1220 (7 pages) (Nov. 4, 2008).

Meitl et al., "Transfer Printing by Kinetic Control of Adhesion to an Elastomeric Stamp," Nature, vol. 5, 33-38 (6 pages) (Jan. 2006).

Omenetto et al., "A New Route for Silk," Nature Photonics, vol. 2, 641-643 (3 pages) (Nov. 2008).

Omenetto et al., "New Opportunities for an Ancient Material," Science, vol. 329, 528-531 (5 pages) (Jul. 30, 2010).

Siegel et al., "Foldable Printed Circuit Boards on Paper Substrates," Advanced Functional Materials, vol. 20, No. 1, 28-35, (8 pages) (Jan. 8, 2010).

Tsukada et al., "Structural Changes of Silk Fibroin Membranes Induced by Immersion in Methanol Aqueous Solutions," Journal of Polymer Science, vol. 32, 961-968 (8 pages) (1994).

Wang et al., "Controlled Release From Multilayer Silk Biomaterial Coatings to Modulate Vascular Cell Responses" Biomaterials, 29, 894-903 (10 pages) (Nov. 28, 2008).

Wikipedia, "Ball bonding" article [online]. Cited in PCT/US2015/051210 search report dated Mar. 1, 2016 with the following information "Jun. 15, 2011 [retrieved on Nov. 15, 2015}. Retrieved 12-18, 29 from the Internet: <URL: https://web.archive.org/web/20110615221003/http://en.wikipedia.org/wiki/Ball_bonding>., entire document, especially para 1, 4, 5, 6," 2 pages, last page says ("last modified on May 11, 2011").

Bossuyt et al., "Stretchable Electronics Technology for Large Area Applications: Fabrication and Mechanical Characterizations", vol. 3, pp. 229-235 (7 pages) (Feb. 2013).

Jones et al., "Stretchable Interconnects for Elastic Electronic Surfaces". vol. 93, pp. 1459-1467 (9 pages) (Aug. 2005).

Lin et al., "Design and Fabrication of Large-Area, Redundant, Stretchable Interconnect Meshes Using Excimer Laser Photoablation and In Situ Masking", (10 pages) (Aug. 2010).

Kim et al., "A Biaxial Stretchable Interconnect With Liquid-Alloy-Covered Joints on Elastomeric Substrate", vol. 18, pp. 138-146 (9 pages) (Feb. 2009).

Kinkeldi et al., "Encapsulation for Flexible Electronic Devices", IEE Electron Device Letters, 32(12):1743-5 (2011).

Hsu et al., "Epidermal electronics: Skin sweat patch", Microsystems, Packaging, Assembly and Circuits Technology Conference (IMPACT), 2012 7th International. IEEE, 2012.

Siegel et al.,"Foldable printed circuit boards on paper substrates", Advanced Functional Materials, 20:28-35 (2010).

Ellerbee et al.,"Quantifying colorimetric assays in paper-based microfluidic devices by measuring the transmission of light through paper", Anal. Chem., 81(20):8447-52 (2009).

Wehner et al.; "A Lightweight Soft Exosuit For Gait Assistance"; IEEE International Conference on Robotics and Automation (ICRA), May 6-10, 2013 Retrieved from https://micro.seas.harvard.edu/papers/Wehner_ICRA13.pdf (8 pages).

(56) References Cited

OTHER PUBLICATIONS

Cauwe et al., "Flexible and Stretchable Circuit Technologies for Space Applications," 5$^{th}$ Electronic Materials, Processes and Packaging for Space, May 20-22, 2014 (18 pages).
Hild, "Surface Energy of Plastics," Dec. 16, 2009. Retrieved from https://www.tstar.com/blog/bid/33845/surface-energy-of-plastics (3 pages).
Hodge et al., "A Microcolorimetric Method for the Determination of Chloride," Microchemical Journal, vol. 7, Issue 3, Sep. 30, 1963, pp. 326-330 (5 pages).
Bonifácio et al., "An improved flow system for the chloride determination in natural waters exploiting solid-phase reactor and long pathlength spectrophotometry," Talanta, vol. 72, Issue 2, Apr. 30, 2007, pp. 663-667 (5 pages).
Meyer et al., "The Effect of Gelatin Cross-Linking on the Bioequivalence of Hard and Soft Gelatin Acetaminophen Capsules," Pharmaceutical Research, vol. 17, No. 8, Aug. 31, 2000, pp. 962-966 (5 pages).
Bang et al.; "The Smart House for Older Persons and Persons With Disabilities: Structure, Technology Arrangements, and Perspectives"; IEEE Transactions on Neural Systems and Rehabilitation Engineering, IEEE Service Center, New York, New York; vol. 12, No. 2, pp. 228-250; Jun. 1, 2004; XP011113818; ISSN: 1534-4320 (23 pages).

\* cited by examiner

WIRELESS CHARGER AND HIGH SPEED DATA OFF-LOADER

PRIORITY CLAIM

This application claims the benefit of U.S. Provisional Patent Application Ser. No. 62/374,510 filed Aug. 12, 2016 entitled "Wireless Charger And High Speed Data Off-Loader.

TECHNICAL FIELD

The present disclosure relates generally to sensors. More particularly, aspects of this disclosure relate to sensors wearable on a body, such as a human body.

BACKGROUND

Integrated circuits (ICs) are the cornerstone of the information age and the foundation of today's information technology industries. The integrated circuit, a.k.a. "chip" or "microchip," is a set of interconnected electronic components, such as transistors, capacitors, and resistors, which are etched or imprinted onto a semiconducting material, such as silicon or germanium. Integrated circuits take on various forms including, as some non-limiting examples, microprocessors, amplifiers, Flash memories, application specific integrated circuits (ASICs), static random access memories (SRAMs), digital signal processors (DSPs), dynamic random access memories (DRAMs), erasable programmable read only memories (EPROMs), and programmable logic. Integrated circuits are used in innumerable products, including computers (e.g., personal, laptop and tablet computers), smartphones, flat-screen televisions, medical instruments, telecommunication and networking equipment, airplanes, watercraft and automobiles.

Advances in integrated circuit technology and microchip manufacturing have led to a steady decrease in chip size and an increase in circuit density and circuit performance. The scale of semiconductor integration has advanced to the point where a single semiconductor chip can hold tens of millions to over a billion devices in a space smaller than a U.S. penny. Moreover, the width of each conducting line in a modern microchip can be made as small as a fraction of a nanometer. The operating speed and overall performance of a semiconductor chip (e.g., clock speed and signal net switching speeds) has concomitantly increased with the level of integration. To keep pace with increases in on-chip circuit switching frequency and circuit density, semiconductor packages currently offer higher pin counts, lower power consumption, greater power dissipation, more protection, and higher speeds than packages of just a few years ago.

The advances in integrated circuits have led to related advances within other fields. One such field is sensors. Advances in integrated circuits have allowed sensors to become smaller and more efficient, while simultaneously becoming more capable of performing complex operations. Other advances in the field of sensors and circuitry in general have led to wearable circuitry, a.k.a. "wearable devices" or "wearable systems." Within the medical field, as an example, wearable devices have given rise to new methods of acquiring, analyzing, and diagnosing medical issues with patients, by having the patient wear a sensor that monitors specific characteristics. Related to the medical field, other wearable devices have been created within the sports and recreational fields for the purpose of monitoring physical activity and fitness. For example, a user may don a wearable device, such as a wearable running coach, to measure the distance traveled during an activity (e.g., running, walking, etc.), and measure the kinematics of the user's motion during the activity.

However, current wearable devices rely on a battery for power. Such devices are therefore limited by the lifespan of the battery as such batteries cannot be easily replaced or recharged. It is also desirable to download data from such devices for further analysis. However, data must be transferred by existing wireless protocols that require a long period of time to transmit large amounts of data. Typically rates of data transmission are kept low in order to conserve device energy, a tradeoff to avoid losing data when the battery runs out of power. For example, performing bulk data downloads using the current Bluetooth Low Energy transmission protocols can be very slow (e.g., approximately 2 kBytes/s-5 kBytes/s). To download 32 MBytes of data, it would take as long as 4.44 hours.

Thus there is need for a system that allows rapid remote recharging of a wearable sensor device. There is also a need for a system that allows rapid download of data from the wearable sensor device. There is also a need to control the downloading of data and charging of these wearable devices.

SUMMARY

According to some embodiments, a wireless control system for wireless charging and data off-loading is disclosed. The wireless control system can include a wireless charging device having a transmitter to transmit a charging signal, a first receiver to receive a data signal and a second receiver to receive a low energy signal. The system can include a sensor device having a memory for storing sensed data, a first receiver to receive a charging signal, a transmitter to transmit a data signal, and a second receiver to receive a low energy signal. The system can include a user device having a transmitter in communication with the second receiver of the wireless charging device and the second receiver of the sensor device. The user device is operative to initiate a data transfer from the sensor device to the wireless charging device.

Another example is a method of transmitting data from a sensor device to a wireless charging device. The sensor device can include a memory for storing sensed data, a first receiver to receive a charging signal, a transmitter to transmit a data signal, and a second receiver to receive a low energy signal. The charging device can include a transmitter to transmit a charging signal, a first receiver to receive a data signal and a second receiver to receive a low energy signal. Sensed data is stored in the memory of the sensor device. Communication is initiated between a user device and the wireless charging device via a transmitter on the user device. Communication is initiated between the user device and the charging device via the transmitter on the user device. Data transfer is initiated between the sensor device and the charging device via the transmitter of the sensor device based on authorization from the user device.

The above summary is not intended to represent each embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and modes for carrying out the present invention when taken in connection with the accompanying drawings and the appended claims.

BRIEF DESCRIPTION OF THE DRAWINGS

The disclosure will be better understood from the following description of exemplary embodiments together with reference to the accompanying drawings, in which.

Figure 1:
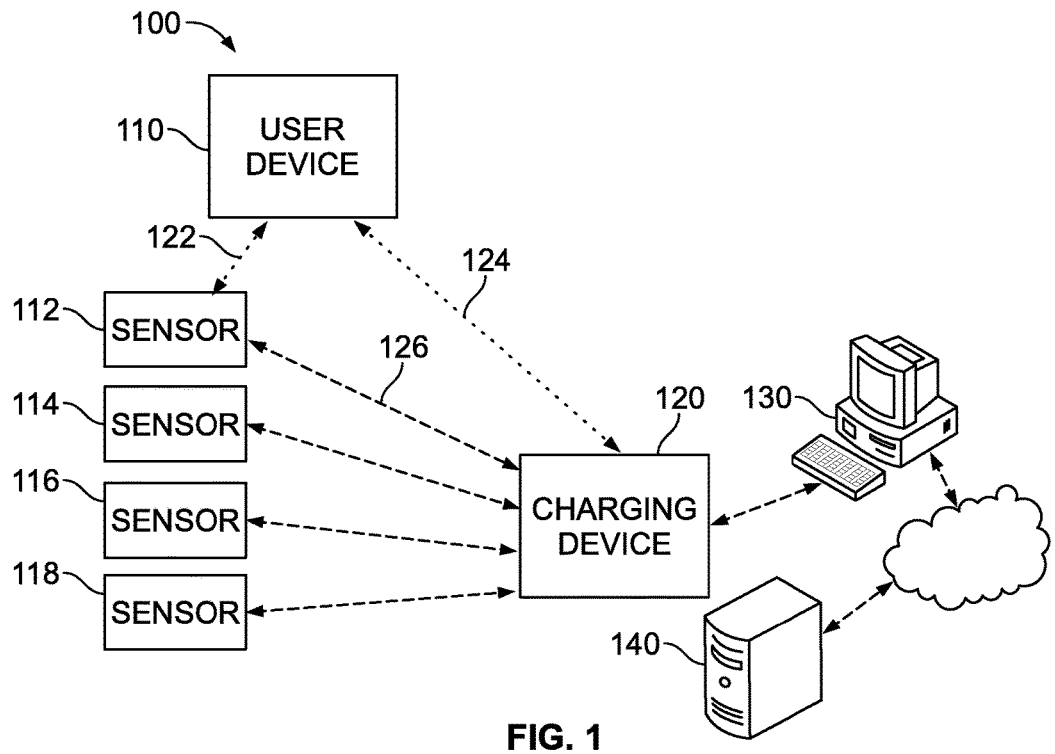
FIG. 1 is a block diagram of a system of implantable devices being in communication with a charger and data downloader.

The present disclosure is susceptible to various modifications and alternative forms, and some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

This disclosure is susceptible of embodiment in many different forms. There are shown in the drawings, and will herein be described in detail, representative embodiments with the understanding that the present disclosure is to be considered as an exemplification of the principles of the present disclosure and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed: the singular includes the plural and vice versa; and the word "including" means "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

FIG. 1 shows a system 100 that includes a smart user device 110 that allows control of wireless charging and data transfer from sensor devices such as different wearable devices 112, 114, 116 and 118. The user device 110 may be a smart phone, a personal digital assistant, a laptop or desktop computer, a tablet computer or similar device such as an iPhone or iPad (from Apple, Inc., Cupertino, Calif.), an Android based device (Nexus, Google, Inc., Mountain View, Ca). The wearable sensing devices 112, 114, 116 and 118 can be worn on (or implanted in) the body of a user and include sensors to monitor a user's biological functions and generate information (e.g., sensor data or information derived from sensor data) about the user's biological functions. The wearable devices can also include a processor and associated memory to generate and/or store the user information and other information, such as, programs, commands, instructions, configuration information, status, and sensor data. The wearable devices can also include a first receiver to receive a charging signal, a first transmitter to transmit a data signal, and a second receiver to receive a low energy signal. One example of a wearable device 112, 114, 116, 118 includes the BioStamp RC device available from MC10 Inc. (Lexington, Mass.). As will be explained below, the wearable devices 112, 114, 116 and 118 can each include a power source such as a battery or a capacitor that can be wirelessly recharged. Further, each of the wearable devices 112, 114, 116 and 118 includes one or more transceivers to enable the device to send and receive information, such as, programs, commands, instructions, configuration information, status, and sensor data. The wearable devices can include more than one transceiver each having a transmitter and receiver and each configured to operate on a different frequency and/or use a different communication protocol. Alternatively, the wearable device can include one transceiver that can operate in two or more modes of operation. For example, a first low energy transceiver can be used to conserve power while enabling the device to send and receive commands and status or data at low data rates while a second higher rate higher energy transceiver may be used when ample power is available to transmit data at higher data rates, such as for bulk data offloading.

The wearable devices 112, 114, 116 and 118 can be moved in proximity to a wireless charging device 120 in order to recharge the power sources of the respective wearable devices and transmit collected data from the wearable devices to a remote computer system (e.g., a cloud server) for storage and analysis. The wireless charging device 120 can simultaneously charge one or more of the wearable devices 112, 114, 116 and 118 at different charging rates as well as transfer data between one or more of the wearable devices 112, 114, 116 and 118 and a remote computer system (e.g., at different transmission rates). The wireless charging device 120 can include a transmitter to transmit a charging signal, a first receiver to receive a data signal and a second receiver to receive a low energy signal. The charging device 120 therefore can incorporate such transmitters and receivers in more than one transceiver (e.g., a low energy transceiver and a higher transmission rate, higher energy transceiver). The user device 110 can be in wireless communication with one or more of the wearable devices 112, 114, 116 and 118 as well as the charging device 120 in order to configure, initiate and control the transfer of data between one or more of the wearable devices 112, 114, 116 and 118 and the charging device while one or more of the wearable devices 112, 114, 116 and 118 is charged (e.g., at one or more charging rates). Communications 122 and 124 between the user device 110 and the wearable devices 112, 114, 116, and 118 and the charging device 120 are generally made with a low energy protocol for the low energy transceivers (e.g., Bluetooth Low Energy (BLE)). As will be explained below, the user device 110 initiates handshaking between at least one of the devices 112, 114, 116 and 118 and the charging device 120 for purposes of establishing a communications 126 between the charging device 120 and the devices 112, 114, 116, and 118 for configuring, initiating and controlling charging and data transfer.

In this example, the initiation and transfer of this data and instructions to charge is gated by the smart user device 110 with a relatively low energy communication protocol such as BLE. The smart user device can communicate with both the charging device 120 and one or more of the wearable devices 112, 114, 116 and 118 either simultaneously or sequentially, in order to configure them in one of several data-transfer modes and one of several charging mode.

The charging device 120 can include a connection to a computer 130 that is in turn in communication with cloud server 140 or can directly communicate with the cloud server 140. The computer 130 can be wirelessly connected to the charging device 120 or may be connected via a hardware connection such as via USB connector. The computer 130 can be connected to a network such as the Internet to transmit received data for storage on the cloud server 140.

Figure 2:
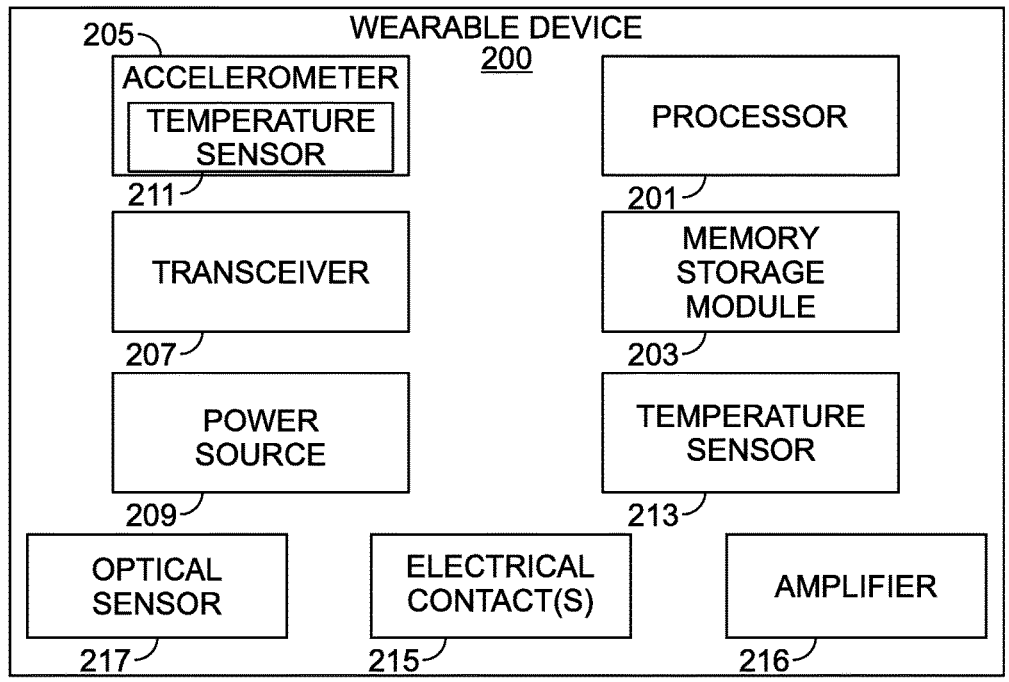
FIG. 2 illustrates an example sensor device in FIG. 1 that is a wearable device.

FIG. 2 shows a diagrammatic example of a wearable sensor device 200 such as the wearable device 112 in FIG. 1 in accord with aspects of the present invention. The wearable device 200 provides conformal sensing capabilities, providing mechanically transparent close contact with a surface (such as the skin or other organ of the body) to provide sensing, measurement and/or analysis of biological or physiological information. According to some embodiments, the wearable device 200 senses, measures, or otherwise quantifies the motion of at least one body part of a user upon which the wearable device 200 is located. Additionally, or in the alternative, according to some embodiments, the wearable device 200 senses, measures, or otherwise quantifies the temperature of the environment of the wearable device 200, including, for example, the skin and/or body temperature at the location that the wearable device 200 is coupled to the body of a user. Additionally, or in the alternative, according to some embodiments, the wearable device 200 senses, measures, or otherwise quantifies other characteristics and/or parameters of the body (e.g., human or animal body) and/or surface of the body, including, for example, electrical signals associated with cardiac activity (e.g., ECG), electrical signals associated with muscle activity (e.g., electromyography (EMG)), changes in electrical potential and/or impedance (e.g., sensed at specific locations of the skin, electrical signals of the brain (e.g., electroencephalogram (EEG)), bioimpedance monitoring (e.g., body-mass index, stress characterization, and sweat quantification), and optically modulated sensing (e.g., photoplethysmography and pulse-wave velocity), and the like.

The wearable device 200 described herein can be formed as a patch. The wearable device 200 can be flexible and/or stretchable, and can include conformal (e.g. stretchable and/or flexible) electronics and conformal electrodes disposed in or on a flexible and/or stretchable substrate. Alternatively, the wearable device 200 may be rigid but otherwise attachable to a user. Thus, the wearable device 200 can be any device that is wearable on a user, such as coupled to the skin of the user, to provide measurement and/or analysis of biological and/or physiological information of the user. For example, the wearable device can be adhered to the body by adhesive, held in place against the body by tape or straps, or held in place against the body by clothing.

In general, the wearable device 200 device of FIG. 2 can include a processor 201 and associated memories, including one or more memory storage module 203. The wearable device 200 further includes one or more sensors, such as an accelerometer 205 and/or a temperature sensor 213. The wearable device 200 can optionally include one or more wireless transceivers, such as transceiver 207, for communicating with other devices. In this example, one transceiver 207 can be a low energy consuming device that uses a low data transmission rate communication protocol such as Bluetooth Low Energy for transferring commands and status information and another transceiver 208 can be a higher speed communication device using a higher capability transmission protocol such as the Gazelle or Shockwave protocol of Nordic Semiconductors. The transceiver 208 can be part of a subsystem for receiving wireless charging signals (e.g., using different charging protocols, such as, Qi™, from the Wireless Power Consortium or AirFuel™ from the AirFuel Alliance). The wearable device 200 can also include a power source (e.g., battery) 209 that provides power for the components of the wearable device 100 and induction coil or other antenna (and charging circuitry) enabling the wearable device 200 to receive electrical energy to recharge the power source 209. In this example, the wearable device 200 can be configured to be recharged by drawing power from a wireless connection or an electromagnetic field (e.g., an induction coil, an NFC reader device, microwaves, and light). The antenna can also be used for transmitting and receiving communications signals. Such communication signals can serve as a communication channel to relay information including but not limited to charge status, device presence, and sensor identification The processor 201 can be a controller that is configured to control the wearable device 200 and components thereof based on computer program code. Thus, the processor 201 can control the wearable device 200 to measure and quantify data indicative of temperature, motion and/or other physiological data, and/or analyze such data indicative of temperature, motion and/or other physiological data according to the principles described herein.

The memory storage module 203 can include one or more submodules and can be configured to save the generated sensor data (e.g., accelerometer 205 information, temperature sensor 213 information, or other biological and/or physiological information, such as ECG, EMG, etc.) or information representative of acceleration and/or temperature and/or other biological and/or physiological information derived from the sensor data. Further, according to some embodiments, the memory storage module 203 can be configured to store the computer program code that controls the processor 201. In some implementations, the memory storage module 203 can be volatile and/or non-volatile memory. For example, the memory storage module 203 can include flash memory, static memory, solid state memory, removable memory cards, or any combination thereof. In certain examples, the memory storage module 203 can be removable from the wearable device 200. In some implementations, the memory storage module 203 can be local to the wearable device 200, while in other examples the memory storage module 203 can be remote from the wearable device 200. For example, the memory storage module 203 can be internal memory of a smartphone such as the user device 110 in FIG. 1 that is in wired or wireless communication with the wearable device 200, such as through radio frequency communication protocols including, for example, WiFi, ZigBee, Bluetooth®, and near-field communication (NFC), and/or optically using, for example, infrared or non-infrared LEDs. In such an example, the wearable device 100 can optionally communicate with the smartphone via an application (e.g., program) executing on the smartphone.

In some embodiments, the generated data, including the temperature information, the acceleration information, and/or the other biological and/or physiological information (e.g., ECG, EMG, etc.), can be stored on the memory storage module 203 for processing at a later time. Thus, in some embodiments, the wearable device 200 can include more than one memory storage module 203, such as one volatile and one non-volatile memory storage module 203. In other examples, the memory storage module 203 can store the information indicative of motion (e.g., acceleration information), temperature information, physiological data, or analysis of such information indicative of motion, temperature, physiological data according to the principles described herein, such as storing historical acceleration information, historical temperature information, historical extracted features, and/or historical locations. The memory storage module 203 can also store time and/or date information about when the information was received from the sensor.

Although described as the processor 201 being configured according to computer program code, the functionality of the wearable device 200 can be implemented based on hardware, software, or firmware or a combination thereof. For example, the memory storage module 203 can include computer program code that can be retrieved and executed by the processor 201. The processor 201 executes the computer program code that implements the functionality discussed below with respect to determining the on-body status of the wearable device 200, the location of the wearable device 200 on a user, and configuring functionality of the wearable device 200. Alternatively, one or more other components of the wearable device 200 can be hardwired to perform some or all of the functionality.

The power source 209 can be any type of rechargeable power source for an electronic device, such as, but not limited to, one or more capacitors, electrochemical cells or batteries. In accordance with some embodiments of the invention, power source can include one or more photovoltaic cells configured to charge one or more capacitors, electrochemical cells and/or batteries. In accordance with some embodiments, the power source 209 can be a small battery or capacitor that stores enough energy for the device to power up and execute a predefined program sequence before running out of energy, for example, an NFC sensing device. As will be explained below, the power source 209 can be charged via a receiver coil from the charging device 120 in FIG. 1.

As discussed above, the wearable device 200 can include one or more sensors, such as the accelerometer 205, a temperature sensor 213, electrical contacts 215 (e.g., electrical contacts or electrodes), and/or an optical sensor 217. In accordance with some embodiments, one or more of the sensors, such as accelerometer 205, the optical sensor 217 and/or electrical contacts 215, can be separate components from the wearable device 200. That is, the wearable device 200 can be connected (by wire or wirelessly) to each sensor (e.g., accelerometer 205, temperature sensor 213, electrical contacts 215, and optical sensor 217). This enables the wearable device 200 to sense conditions at one or more locations that are remote from the wearable device 200. In accordance with some embodiments, the wearable device 200 can include one or more integral sensors in addition to one or more remote sensors.

The accelerometer 205 can be configured to measure and/or generate acceleration information indicative of a motion and/or acceleration of the wearable device 200, including information indicative of a user wearing, and/or body parts of the user wearing, the wearable device 200. In accordance with one embodiment, the accelerometer 205 within the wearable device 200 can include a 3-axis accelerometer that generates acceleration information with respect to the x-axis, the y-axis, and the z-axis of the accelerometer based on the acceleration experienced by the wearable device 200. Alternatively, the wearable device 200 can include three independent accelerometers (not shown for illustrative convenience) that each generate acceleration information with respect to a single axis, such as the x-axis, the y-axis, or the z-axis of the wearable device 200. Alternatively, the wearable device 200 can include an inertial measurement unit (IMU) that measures the velocity, the orientation, and the acceleration using a combination of one or more accelerometers, gyroscopes, and magnetometers. Thus, although generally referred to herein as an accelerometer 205, the accelerometer 205 can be any motion sensing element or combination of elements that provides acceleration information.

According to some embodiments, the accelerometer 205 includes a detection range of ±4 times the force of gravity (Gs). However, other accelerometers having a detection range between ±2 Gs or less and ±10 Gs or more can be used. Further, the accelerometer 205 can have a sampling rate of 50 hertz (Hz) such that each second the accelerometer 205 generates 150 points of acceleration information, or 50 points within each axis. However, the sampling rate can vary, such as being 20 Hz to 100 Hz depending of the mode or attribute being monitored.

According to some embodiments, one or more sensors of the wearable device 200, such as the accelerometer 205, can include a built-in temperature sensor, such as the temperature sensor 211 within the accelerometer 205. For example, the temperature sensor 211 within the accelerometer 205 can be used to calibrate the accelerometer 205 over a wide temperature range and to measure the temperature of the area of the body that the accelerometer 205 is coupled to. Other temperature sensors included with other device components can also be used. Other than the accelerometer 205, and temperature sensor 211, other subcomponents or elements of the wearable device 200 can include one or more microelectromechanical system (MEMS) components within the wearable device 200 that is designed to measure motion or orientation (e.g., angular-rate gyroscope, etc.). Alternatively, or in addition, the wearable device 200 can include a discrete temperature sensor, such as the temperature sensor 213 which can be positioned in a different location from the wearable device 200. The wearable device 200 can use the temperature information detected by the temperature sensor 211 and/or the temperature sensor 213 according to various methods and processes, as discussed in greater detail below. For purposes of convenience, reference is made below to the temperature sensor 211. However, such reference is not limited to apply only to the temperature sensor 211, but applies to any one or more temperature sensors within or connected to the wearable device 200.

The electrical contacts 215 can be formed of conductive material (e.g., copper, silver, gold, aluminum, a hydrogel, conductive polymer, etc.) and provide an interface between the wearable device 200 and the skin of the user 100, for receiving electrical signals (e.g., ECG, EMG, etc.) from the skin. The electrical contacts 215 can include one or more electrical contacts 215, such as two electrical contacts 215, electrically connecting the skin of the user 100 to an amplifier circuit that can be part of an analog front end circuit 216, to amplify and condition electrical signals (e.g., ECG, EMG, etc). With two electrical contacts 215, one contact can be electrically configured as a positive contact and the other contact can be electrically configured as a negative contact. However, in some aspects, there may be more than two electrical contacts, such as four electrical contacts 215 (e.g., two positive and two negative electrical contacts), six electrical contacts 215, etc.

The optical sensor 217 can measure the photoplethysmography (PPG) signal when placed on the skin's surface, allowing for the monitoring of various biometrics including, but not limited to, heart rate, respiration, and blood oxygen measurements. The optical sensor 217 can include one or more light emitters that can emit red, green, infrared light or a combination thereof and one or more optical transducers (e.g., photodiode, CCD sensors). Using the one or more optical transducers, the optical sensor 217 can sense the wavelength of the reflected light. In this example, the optical sensor 217 illuminates the skin and the reflected light changes intensity based on the concentration of oxygen in a blood vessel such as an artery or a capillary bed. Thus, a pulse can be detected as a change in the amount of the reflected light due to a change in the concentration of oxygen in a blood vessel and thus the reflected light detected by the optical sensor 217. Of course other sensors can be included on the wearable device 200 to detect the pulse such as the accelerometer 205, a pressure sensor, a strain gauge sensor or an acoustic sensor to measure the mechanoacoustic signatures of the pulse.

In addition to the above-described components, the wearable device 200 can include one or more additional components without departing from the spirit and scope of the present disclosure. Such components can include a display (e.g., one or more light-emitting diodes (LEDs), liquid crystal display (LCD), organic light-emitting diode (OLED)), a speaker, a microphone, a vibration motor, a barometer, a light sensor, a photoelectric sensor, or any other sensor for sensing, measuring, or otherwise quantifying parameters and/or characteristics of the body. In other embodiments of the invention, the wearable device 200 can include components for performing one or more additional sensor modalities, such as, but not limited to, hydration level measurements, conductance measurements, capacitance measurements, and/or pressure measurements. For example, the wearable device 200 can be configured to, or include one or more components that, perform any combination of these different types of sensor measurements, in addition to the accelerometer 205 and temperature sensor 211.

Referring back to the temperature sensor 211, according to some embodiments, the primary purpose of the temperature sensor 211 is for calibrating the accelerometer 205. Accordingly, the temperature sensor 211 does not rely on direct contact to an object to detect the temperature. By way of example, the temperature sensor 211 does not require direct contact to the skin of a user when coupled to the user to determine the skin temperature. For example, the skin temperature affects the temperature information generated by the wearable device 200 without direct contact between the temperature sensor 211 and the skin. Accordingly, the temperature sensor 211 can be fully encapsulated and, therefore, be waterproof for greater durability. The thermal conductivity of the encapsulating material can be selected to control the ability of the temperature sensor 211 to detect the temperature without direct contact.

Temperature information generated by the temperature sensor 211 can be used by the wearable device 200 to determine an on-body status of the wearable device 200. Detection of the on-body status allows the wearable device 200 to automatically determine when the device is or is not coupled to a user. Functionality of the wearable device 200 (e.g., the computer program executed and/or components activated) can be selected or changed based on the detected on-body status.

The wearable device 200 can use the temperature information from the temperature sensor 211 based on the relationship that exists between the detected temperature information when the wearable device 200 is coupled to the body versus when the wearable device 200 is not coupled the body. More specifically, the wearable device 200 can use the difference between ambient air temperature and the skin temperature of the user to determine on body status.

When the wearable device 200 is coupled to the body, the measured temperature is primarily influenced by the skin temperature at the coupling location. In contrast, when the wearable device 200 is not coupled to the body, the measured temperature is primarily influenced by the ambient air temperature. That is, in general, when coupled to the body of the user, the heat generated by the user's body elevates the measured temperature to greater than the ambient air temperature. For most ambient air temperatures, the skin temperature at the coupling location is greater than the ambient air temperature. Thus, the wearable device 200 being off the body versus on the body is reflected in the changes of the temperature information generated by the temperature sensor 211.

The temperature information can be used to determine an on-body state of the wearable device 200. The temperature information can be raw temperature information (e.g., unscaled) or normalized temperature information (e.g., scaled). Such normalization can include relating the raw temperature information to a specific temperature scale, such as Celsius, Fahrenheit, etc. Further, the temperature information detected by the temperature sensor 211 can include the temperature (raw or normalized), the change in temperature, and/or the rate of change in temperature. Depending on one or more of the temperature, the change in temperature, and the rate of change in temperature, the wearable device 200 can determine the on-body state by, for example, comparing the temperature, change in temperature, or rate of change in temperature to an ambient temperature value or a predefined value (e.g., from a lookup table or a decision tree).

By way of example, and without limitation, during a first state or period, the temperature sensor 211 within the wearable device 200 may generate a detected normalized temperature of 20° C. Subsequently, the wearable device 200 may generate a detected normalized temperature of 31° C. The normalized temperatures can be used to determine the on-body status of the wearable device 200. According to some embodiments, the temperature (e.g., 31° C.) alone indicates the on-body status of the wearable device 200. One or more specific temperature values (e.g., scaled or unscaled) can be correlated to an on-body status, such as on the body or off of the body. Accordingly, when one of the specific temperature values is reached (or a temperature change is reached), the wearable device 200 determines on-body status accordingly. Alternatively, or in addition, one or more thresholds may be previously correlated to an on-body status. Accordingly, when one of the thresholds is met, the wearable device 200 determines its on-body status accordingly. By way of example, and without limitation, a threshold may be 24° C. such that a temperature above 24° C. correlates to the wearable device 200 being on the body.

According to some embodiments, the wearable device 200 can include machine learning to, for example, modify the thresholds based on repeated usage of the wearable device 200, such that the on-body status (and/or specific locations) determined by one sensing modality (e.g., accelerometer based location) can be used to update the thresholds or indicators for use with another sensing modality (e.g., temperature). Further, according to some embodiments, specific individuals have specific heat signatures or variations in temperature with respect to location of the wearable device 200. Thus, according to some embodiments, the wearable device 200 can use historical temperature information to determine the identity of the user wearing the wearable device 200, in addition to determining the on-body status. The determination as to the identity of the wearer of the wearable device 200 can also use information from one or more of the components of the wearable device 200.

According to some embodiments, the change in temperature (e.g., 20° C. to 31° C.) indicates the on-body status of the wearable device 200. The wearable device 200 can use the change in temperature to omit false on-body statuses that are based on, for example, elevated ambient temperatures. By way of example, depending on certain locations and/or activities, the ambient air temperature's effect on the temperature sensor 211 may give a false on-body status. Accordingly, the change in temperature can be used to determine the on-body status in which a lower temperature is used as an indicator of, for example, the ambient air temperature (e.g., the wearable device 200 not coupled to the body). A change in temperature from, for example, 20° C. to 31° C. can indicate that the wearable device 200 went from being off of the body (e.g., in an ambient air environment at 20° C.) to being on the body and now registering a temperature of 31° C. (e.g., body surface temperature).

Along with the temperature information, the temperature sensor 211, or another sensor or component within the wearable device 200 (e.g., processor 201, transceiver 207, etc.), can measure time or can generate information based on a set rate (e.g., one measurement every three seconds). The measured time can be correlated to the temperature information. Such correlation of the time to the temperature information can be used for determining the on-body state of the wearable device 200. For example, the rate of change in temperature (e.g., 20° C. to 31° C. over the course of, for example, 30 seconds) can indicate the on-body status of the wearable device 200. Whereas, for example, the rate of change in temperature (e.g., 20° C. to 31° C. over the course of, for example, 30 minutes) can indicate the wearable device 200 is left in the sun or a hot car and this information can be combined with other sensor data, such as accelerometer data, to confirm a lack of movement. Using both the change in the temperature and the time during which the change occurred to obtain the rate can further eliminate false on-body statuses, such as eliminating the ambient air temperature changing over a period of time, which could possibly provide a false on-body status.

Figure 3:
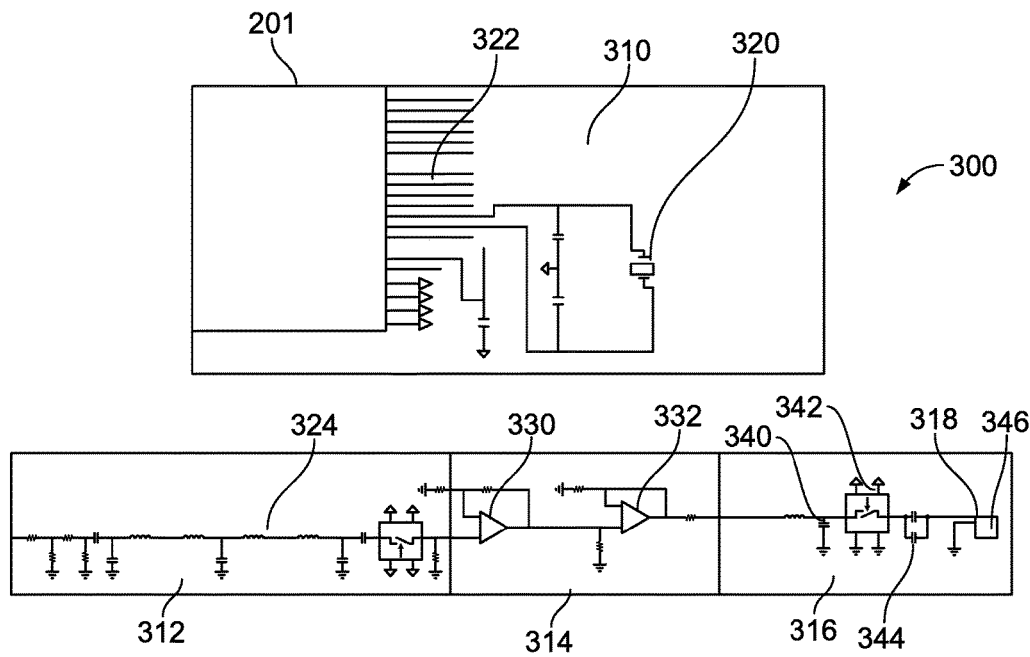
FIG. 3 is a block diagram of a charging device circuit facilitating wireless charging.

FIG. 3 shows a wireless charging circuit 300 on the wearable device 200 shown in FIG. 2. The wireless charging circuit 300 can include a RF power chain (shown below). In this example, the RF power chain 300 ensures a 90% battery charge in roughly 90 minutes on the wearable device 200.

In accordance with some embodiments of the invention, the RF chain can include an RF source circuit 310, an attenuation and filtering circuit 312, a gain circuit 314, and matching network circuit 316 to generate a charging signal in a coil 320. The RF source circuit 310 can include a crystal 320. In this example, the crystal 320 has 30 parts per million error over a suitable temperature range of 30 to 60 degrees C. In this example, the RF source is generated using a filtered and buffered digital output from the microcontroller 201 in FIG. 2 to provide a low output impedance rail to rail 13.56 MHz signal output 322.

In accordance with some embodiments of the invention, the buffered digital clock output from the microprocessor 201 is routed to the attenuation and filtering circuit 312. The attenuation and filtering circuit 312 can include a filter circuit 324 that filters out higher harmonics in the square wave to produce a sinusoid signal. This results in less reflections, better power transfer, and less unwanted RF radiation.

In accordance with some embodiments of the invention, the signal from the attenuation and filtering circuit 312 can be sent to a gain circuit 314. The gain circuit 314 can include two operational amplifiers 330 and 332. In the gain circuit 314, the signal can be amplified to maximize the voltage driving the coil. The operational amplifiers 330 and 332 can be split into two stages to avoid gain bandwidth issues. The operational amplifiers 332 can be selected for high frequency capabilities and high output current.

In accordance with some embodiments of the invention, a matching network circuit 340 can be used to minimize reflections and maximize wireless power transfer. The matching network circuit 340 can include tuning capacitors and inductors. A series tuning capacitor 344 can be used to maximize power through a coil 346 at the resonance frequency, 13.56 MHz.

Figure 4:
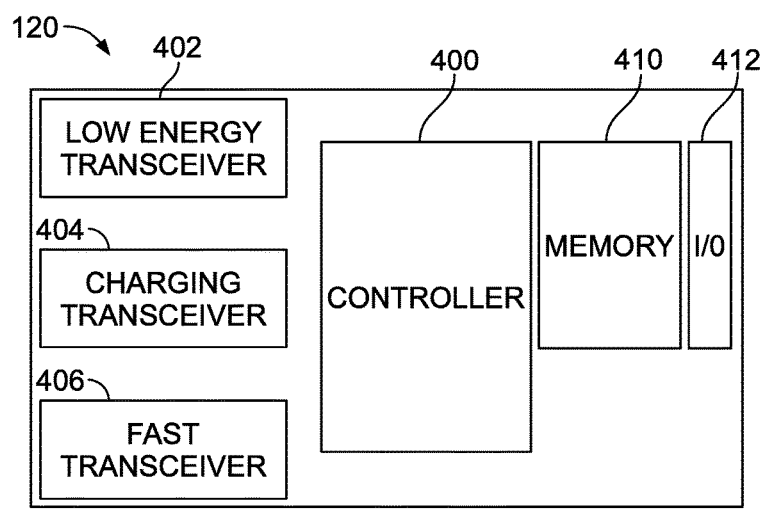
FIG. 4 is a block diagram of the charging device in FIG. 1.

FIG. 4 is a block diagram of the charging device 120 in FIG. 1 according to some embodiments of the invention. The charging device 120 can include a microcontroller or microprocessor 400 that controls the internal components. The charging device 120 can include a low energy transceiver 402, a wireless charging transceiver 404, and a fast data transceiver 406. The charging device 120 also includes a memory 410 for storage of data. The data in the memory 410 may be transferred to another computing device via input/output interface 412 that may be a USB port in this example. Of course other wired and wireless interfaces may be used.

In this example, the low energy transceiver 402 can use the Bluetooth Low Energy (BLE) transmission protocol. Thus, performing bulk data downloads using the BLE hardware and firmware is very slow (roughly 2 kBytes/s-5 kBytes/s). For example, downloading 32 MBytes of data from the example wearable device 112 takes as long as 4.44 hours. The fast data transceiver 406 has a faster rate of data transmission than the low energy transceiver 402. In this example, the fast data transceiver 406 is a NRF51822, Microcontroller capable of the Gazelle or Enhanced Shock Burst protocol by Nordic Semiconductor. In this example, the fast data transceiver 406 has a data throughput as high as 25 kBytes/s, a 5-10× improvement over the low energy transceiver 402. Switching between the Gazelle protocol of the fast transceiver 406 and the Bluetooth Low Energy (BTLE) of the low energy transceiver 402 can be performed on the fly in firmware on the charging device 120, enabling the low power advantages of the BTLE protocol and the high data throughput of the Gazelle protocol on the same device with no hardware changes. In order to enable this advantage, both the wireless charging device 120 and the wearable device 112 both have a transceiver controller capable of the high speed transmission protocol such as the NRF51822 Microcontroller.

The microcontroller or microprocessor 400 can be part of the same hardware component (e.g., a system on a chip device) as the transceiver 406 or it can be a separate device. The microprocessor 400 operates the general functions of the charging device 120. The microprocessor 400 also runs applications to control the charging and data reception from wearable devices via communication with the user device 110 in FIG. 1.

Figure 5:
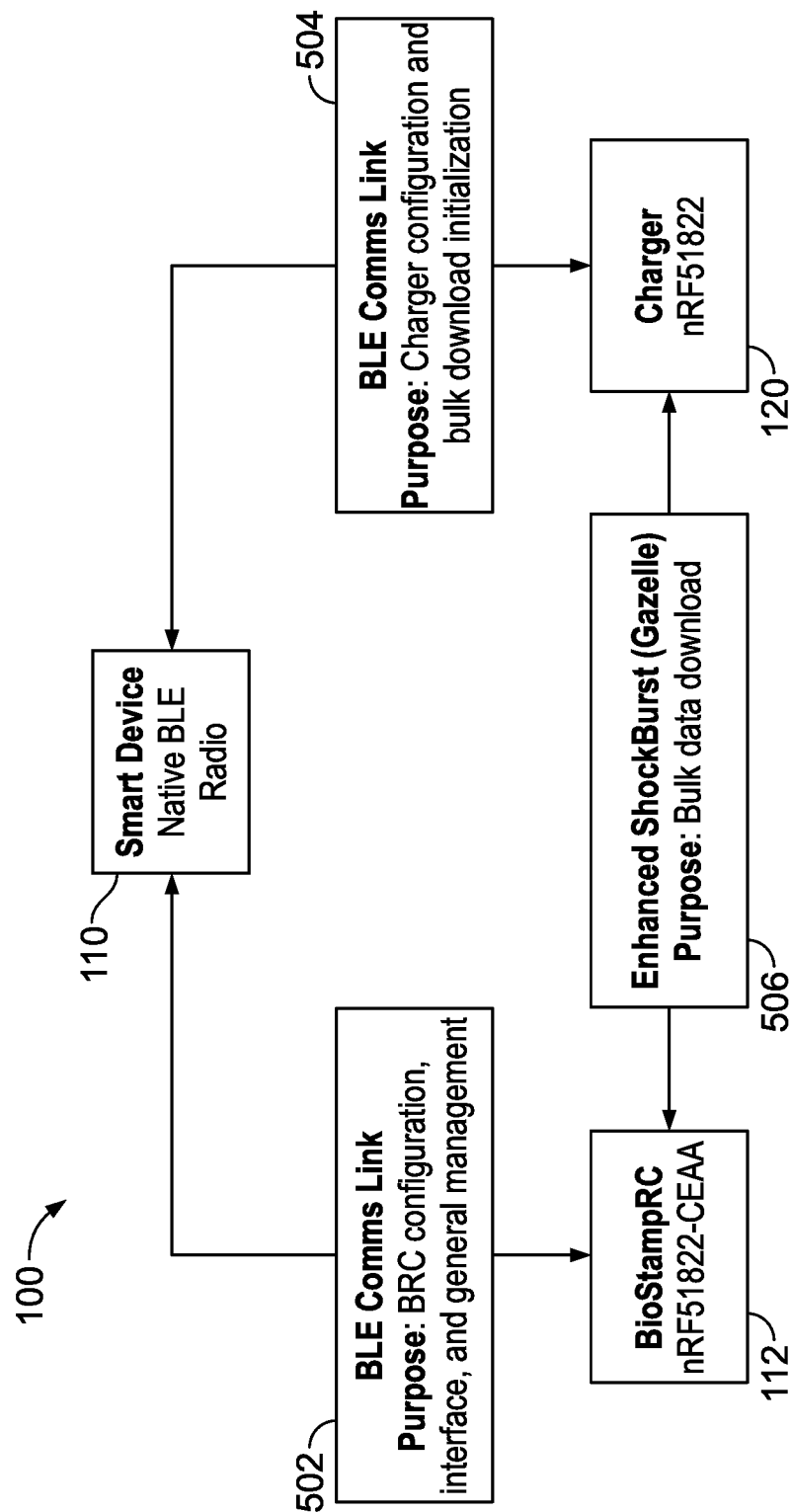
FIG. 5 is a flow diagram for the communication of the smart device, charger and implantable device.

As explained above, the initiation and transfer of this data between the wearable sensor device 112 and the charging device 120 can be controlled by a smart device with a BTLE transceiver, such as the smart device 110. As explained above, the smart device 110 communicates to both the charging device 120 and wearable device 112 in order to put them in one or more data-transfer mode. FIG. 4 shows the process by the smart device 110 controlling the charging and data transfer to the charging device 120 in FIG. 1. As shown in FIG. 5, a low energy communication channel 502 is established between the user device 110 and the wearable device 112. Similarly, a low energy communication channel 504 is established between the user device 110 and the charging device 120. A wireless charging and data transmission channel 506 is established between the wearable device 112 and the charging device 120.

The low energy communication channel 502 serves to provide device configuration, interface and general management of the wearable device 112 from the user smart device 110. The management includes identifying the particular wearable device, status information on the power level of the wearable device 112 and how much data has been collected by the wearable device 112. The low energy communication channel 504 serves to provide charger configuration and bulk download configuration from the user smart device 110 to the charging device 120. These instructions may include the selection of charging or data transmission, the rate of charging or data transmission, the identification of the specific wearable device, the charge state of the device, and the memory state of the device (e.g., ready for download/downloaded). After authorization from the user device 110, the charging and communication channel 406 is established between the charging device 120 and the wearable device 110. The communication rate is established by command from the user device 110.

Figure 6:
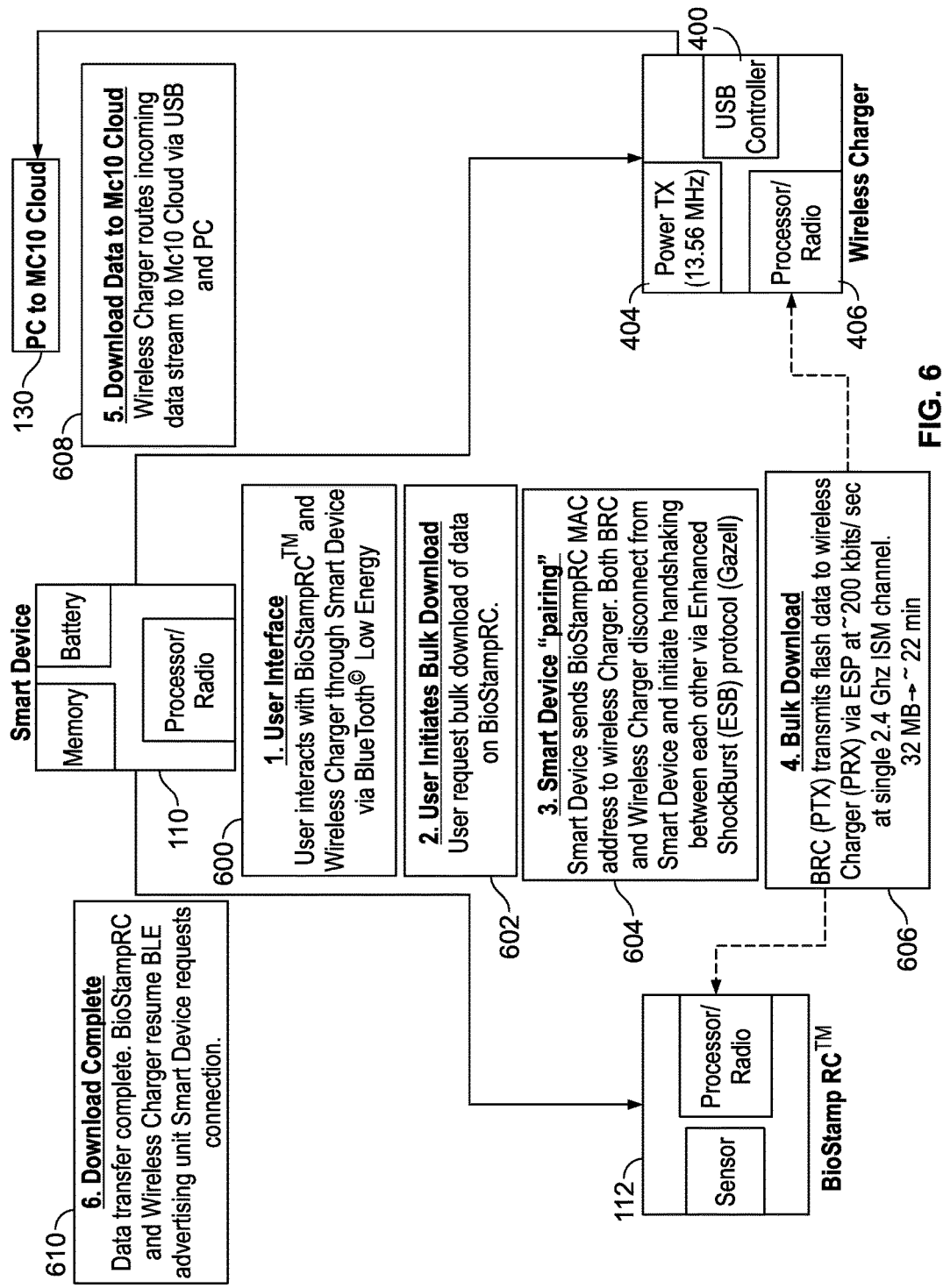
FIG. 6 is a flow diagram for the prioritization of charging and transferring data from multiple devices.

FIG. 6 is a flow diagram of the procedure to download data from the wearable device 112 in the environment in FIG. 1 using the communication links in FIG. 5. Initially, the charging device 120 is in Bluetooth low energy advertising mode. Once a user device 110 is in range of the charging device, the user device 110 initiates handshaking with the wearable device 112 and the charging device 120 (600). After initiation of handshaking, the user device 110 instructs the charging device 120 and the wearable device 112 when to initiate data transfer (602). The two devices will pair up via Gazelle automatically based on their MAC addresses that are received from the user device 110 (604). The pairing process disconnects the charging device 120 and the wearable device 112 from the user device 110. The charging device 120 and the wearable device 112 initiate a handshake protocol for either charging or wireless data transmission. The charging device 120 will download the data at the designated data transmission rate (606). The charging device 120 then either stores that data to local memory, or offloads this data through a wired connection to another device such as a computer 130 (e.g., PC/tablet) or via an unwired connection such as WiFi (608). This data can then be sent to the cloud server 140, and the wearable device 112 returns to normal operation for monitoring and gathering data while the charging device 120 returns to Bluetooth low energy advertising mode. Individual device detection is performed via a handshaking protocol where individual channels of the charging device periodically modulate the local wireless power signal in a predefined pattern that is detectable by the wearable devices. Once the wearable devices detect the load modulation pattern they communicate with the charging device and other wearable devices over the low energy communication channel to arbitrate and assign/unassign device/channel pairings.

In another example, the charger 120 can communicate simultaneously with multiple wearable devices such as the wearable devices 112, 114, 116 and 118 in FIG. 1. For the detection and charging of multiple devices, a separate charging coil 344, gain stage 314, and matching network 316 shown in FIG. 3 is required for each device. Detection of multiple devices can be handled by the charging device 120 through antenna backscattering or by the wearable device through detection of valid power received via the charging circuitry. In the embodiment using antenna backscattering the microcontroller 400 measures the amount of electrical current delivered to any of its charging coils 344. This electrical current will change from baseline when a device is placed in proximity to the charging device 140. The device to be charged uses this detection mechanism to send a keyed signature back to the charging device 120 by detuning its own charging coil periodically. Once the charging device 120 confirms the unique backscattering signature from the device, it will begin transmitting power continuously through its charging coil 344. With multiple charging coils on a single charging device, the microcontroller 400 can determine what device is on which coil—especially if each device has its own unique signature—and will only deliver power to charging coils coupled with confirmed devices. In the embodiment where detection of multiple devices is handled by the wearable device, the charging device 120 periodically modulates the local wireless power signal in a predefined pattern sequentially for each channel. Once wearable devices detect the load modulation pattern they communicate with the charging device and other wearable devices over the low energy communication channel to arbitrate and assign/unassign device/channel pairings.

In this architecture, the charging device 120 can prioritize and queue data transfer from each wearable device 112, 114, 116 and 118 based on an optimization scheme. This data scheme can be based on a set of assumptions and real time metrics from the wearable devices to determine a Figure of Merit (FOM) that the charger can use to rank and prioritize data-offloading using the following procedure. Data can be transferred from the devices to the charging using the following protocols: Bluetooth, Bluetooth Low Energy, ANT, Enhanced Shock Burst (Gazelle), Wifi, and any other wireless protocol which is carried on the 2.4 GHz wavelength. The charging device 120 can receive data relating to battery voltages, files to download, and used-memory capacity from each of the user devices 112, 114, 116 and 118 in the area, either directly (e.g, based on commands issued from the user device 110) or indirectly (e.g., through the user device 110). The microprocessor 400 of the charging device 120 can include a program or process that performs an assessment of each wearable device by determining the Figure of Merit:

$$FOM = Battery\ Voltage * number\ of\ Files/Used\ Memory$$

where Battery Voltage is in Volts (V), number of Files is unitless, and Used Memory is in Megabytes (MB).

The output of the FOM is a numerical value that is directly proportional to the battery level, the amount of data to be off loaded (e.g., number of data files or recordings) and indirectly proportional to an amount of memory used by the device to store the data. The user device 110 and/or the wireless charger 120 can use the FOM to identify the wearable devices that have high battery capacity or a large number of records to download and to rank or prioritize these devices for data transfer to prevent data loss.

In accordance with some embodiments of the invention, the user device 110 (or the wireless charger 120) can compare the FOM of a wearable device to a predefined threshold to determine whether the wearable device has a FOM below that threshold, and the user device 110 can communicate instructions to the charger device 120 (e.g., via the Bluetooth Low Energy communication 122) to charge the wearable device prior to data transfer. After the wearable device is charged (e.g., either fully or at or above a predefined threshold), the user device 110 can communicate instructions to the charging device 120 to switch to charging mode. If the user device 110 (or the charger device 120) determines that the wearable device has a FOM above the predefined threshold, the user device 110 can communicate instructions to the charging device 120 instructing it to queue the wearable device (based on its FOM) for data offload and perform a data transfer according to its position in the queue, relative to some or all other wearable devices.

The system 100 allows charging of wearable sensor devices wirelessly and performing bulk data downloads at higher throughputs than Bluetooth Low Energy currently provides. The system 100 also allows execution of intelligent charging and data-offloading strategies to accommodate the needs of multiple devices simultaneously. In addition, the system 100 allows different levels of access to faster data-offloading speeds from the wearable sensor device, so consumers no longer need to wait after they collect data to perform an analysis. The wearable sensor device can switch between multiple protocols enabling the wearable sensor device to be power efficient while also having high data throughput capabilities In accordance with some embodiments of the invention, the wireless charger 120 can include software and/or hardware that are capable of wirelessly charging a device (e.g., a user device 110) at different rates. For example, the Qi wireless charging standard from the Wireless Power Consortium includes a standard charging rate (e.g., 5 watts) and a fast charging rate (e.g., 15 watts). The wireless charger 120 can include a processor and associated memory and execute one or more programs that enable the wireless to selectively operate in the standard charging rate mode or a fast charging rate mode. By default, when a user device 110 is placed on the wireless charger 120, the wireless charger 120 will operate in standard charging rate mode. In accordance with some embodiments of the invention, the wireless charger 120 can communicate with the user device 110 either directly (e.g., using WiFi or Bluetooth) or indirectly (e.g., using WiFi or Bluetooth through a remote device) to negotiate a different (e.g., faster) charging rate, optionally for a fee or other consideration. In accordance with some embodiments of the invention, the user device 110 can negotiate a faster charging rate for a one-time fee that places the wireless charger in a faster charging rate mode and enables the user device 110 to be charged at the higher rate for a predefined period of time (e.g., 15 min., 30 min., 45 min., 1 hr., 90 min., 2 hrs., 3 hrs., 24 hrs., or longer). For example, the wireless charger 120 can provide a token to the user device 110 that In accordance with some embodiments of the invention, the user device 110 can negotiate a faster charging rate for a flat or periodic fee (e.g., establishing a wireless charging account) that places the wireless charger in a faster charging rate mode and enables the user device 110 to be charged at the higher rate for as long as the account is active or maintained (e.g., paid up).

In accordance with some embodiments of the invention, the wireless charger 120 can include software and/or hardware that are capable of communicating with a device (e.g., a user device 110) or controlling a remote wireless access point to communicate with a device (e.g., a user device 110) at different data rates. For example, the WiFi standards include several different communication standards (e.g., IEEE 802.11b, 802.11g, 802.11ac, 802.11n) that support different data rates. Similarly, Bluetooth™ also supports multiple data rate modes of operation (e.g., classic, enhanced data rate and high speed). The wireless charger 120 can include a processor and associated memory and execute one or more programs that enable the wireless charger 120 to selectively communicate with the user device 110 at a standard data rate or a faster date rate. By default, when a user device 110 is placed on the wireless charger 120, the wireless charger 120 will communicate in a standard data rate mode. Similarly, the wireless charger 120 can communicate with the user device 110 either directly (e.g., using WiFi or Bluetooth) or indirectly (e.g., using WiFi or Bluetooth through a remote device) to negotiate a different (e.g., faster) data communication rate, optionally for a fee or other consideration. In accordance with some embodiments of the invention, the user device 110 can negotiate a faster data rate for a one-time fee that places the wireless charger 120 (or the wireless access point) in a faster data rate mode and enables the user device 110 to access a network (e.g., the Internet) at the higher data rate for a predefined period of time (e.g., 15 min., 30 min., 45 min., 1 hr., 90 min., 2 hrs., 3 hrs., 24 hrs., or longer). For example, the user device 110 can purchase a token and provide the token to the wireless charger 120 that expires after a predefined period of time. In accordance with some embodiments of the invention, the user device 110 can negotiate a faster data rate for a flat or periodic fee (e.g., establishing a wireless charging account) that places the wireless charger 120 (or wireless access point) in a faster data rate mode and enables the user device 110 to access a network (e.g., the Internet) at the higher data rate for as long as the account is active or maintained (e.g., paid up).

In some embodiments, the aforementioned methods include at least those steps enumerated above. It is also within the scope and spirit of the present disclosure to omit steps, include additional steps, and/or modify the order of steps presented herein. It should be further noted that each of the foregoing methods can be representative of a single sequence of related steps; however, it is expected that each of these methods will be practiced in a systematic and repetitive manner.

The disclosure discussed herein can be applied to any wearable device 100 and/or system including the capability of determining 3-axis accelerometer information, which can enable a broad range of commercial applications. Such applications may include one that requires the user to place a sensor at different body locations to derive location-specific information. A wearable running coach, a wearable cross-fit monitor, and a wearable Parkinson's disease motor symptom monitor are but a few examples of such applications.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:
1. A wireless control system comprising:
a wireless charging device including a transmitter to transmit a charging signal, a first receiver to receive a data signal and a second receiver to receive a low energy signal;

a sensor device including a memory for storing sensed data, a first receiver to receive a charging signal, a first transmitter to transmit a data signal, and a second receiver to receive a low energy signal, wherein the transmitter of the wireless charging device is a transceiver operating in a fast data transfer protocol and the second receiver of the wireless charging device operates in a slower data transfer protocol, and wherein one of the protocols is used for the data transfer from the sensor device; and a user device including a low energy transmitter in communication with the second receiver of the wireless charging device and the second receiver of the sensor device, the user device operative to initiate a data transfer from the sensor device to the wireless charging device.

2. The wireless control system of claim 1, wherein the sensor device is one of a plurality of sensor devices, each of the plurality of sensor devices in communication via a low energy signal with the user device.

3. The wireless control system of claim 2, wherein the user device is operative to initiate the transmission of a charging signal from the charging device to the sensor device.

4. The wireless control system of claim 3, wherein the user device prioritizes one of the plurality of sensor devices for receiving the charging signal from the charging device.

5. The wireless control system of claim 4, wherein the prioritization is based on a power level of each of the plurality of sensor devices.

6. The wireless control system of claim 3, wherein the prioritization is based on payment by a user through the user device for the sensor device.

7. The wireless control system of claim 2, wherein the user device prioritizes one of the plurality of sensor devices for transmitting the data signal to the charging device.

8. The wireless control system of claim 7, wherein the prioritization is based on the amount of data stored on each of the plurality of sensor devices.

9. The wireless control system of claim 7, wherein the prioritization is based on the power level on each of the plurality of sensor devices.

10. The wireless control system of claim 7, wherein the prioritization is based on payment by a user through the user device for the sensor device.

11. The wireless control system of claim 1, wherein the sensor device is a wearable device adhered to the skin of a user.

12. The wireless control system of claim 1, wherein the user device transmitter and the second receiver of the sensor device and second receiver of the charging device are Bluetooth low energy transceivers.

13. The wireless control system of claim 1, wherein the transmitter of the wireless charging device transmits a charging signal and the second receiver of the wireless charging device receives the data signal from the sensor device simultaneously.

14. The wireless control system of claim 1, wherein the user device selects the fast data transfer protocol or the slower data transfer protocol for the charging device receiving the data signal from the sensor device.

15. The wireless control system of claim 1, wherein the fast data transfer protocol is the Enhanced Shock Burst data protocol and the slower data transfer protocol is the Bluetooth protocol.

16. The wireless control system of claim 1, wherein the selection of the protocol is based on payment received from a user through the user device.

17. The wireless control system of claim 1, wherein the user device is one of a smart phone, a lap top computer, a tablet, or a personal data assistant.

18. A method of transmitting data from a sensor device to a wireless charging device, the sensor device including a memory for storing sensed data, a first receiver to receive a charging signal, a transmitter to a data signal, and a second receiver to receive a low energy signal, wherein the transmitter of the wireless charging device is a transceiver operating in a fast data transfer protocol and the second receiver of the wireless charging device operates in a slower data transfer protocol, and wherein one of the protocols is used for the data transfer from the sensor device, the charging device including a transmitter to transmit a charging signal, a first receiver to receive a data signal and a second receiver to receive a low energy signal, the method comprising:

storing sensed data in the memory of the sensor device;

initiating communication between a user device and the charging device via a low energy transmitter on the user device;

initiating communication between the user device and the charging device via the low energy transmitter on the user device; and initiating data transfer between the sensor device and the charging device via the first transmitter of the sensor device based on authorization from the user device.

19. The method of claim 18, wherein the sensor device is one of a plurality of sensor devices, each of the plurality of sensor devices in communication via a low energy signal with the user device.

20. The method of claim 19, further comprising initiating transmission of a charging signal from the charging device to the sensor device by the user device.

21. The method of claim 20, wherein the user device prioritizes one of the plurality of sensor devices for receiving the charging signal from the charging device.

22. The method of claim 21, wherein the prioritization is based on a power level of each of the plurality of sensor devices.

23. The method of claim 20, wherein the prioritization is based on payment by a user through the user device for the sensor device.

24. The method of claim 19, wherein the user device prioritizes one of the plurality of sensor devices for transmitting the data signal to the charging device.

25. The method of claim 24, wherein the prioritization is based on the amount of data stored on each of the plurality of sensor devices.

26. The method of claim 24, wherein the prioritization is based on the power level on each of the plurality of sensor devices.

27. The method of claim 24, wherein the prioritization is based on payment by a user through the user device for the sensor device.

28. The method of claim 18, wherein the sensor device is a wearable device adhered to the skin of a user.

29. The method of claim 18, wherein the user device transmitter and the second receiver of the sensor device and the second receiver of the charging device are Bluetooth low energy transceivers.

30. The method of claim 18, wherein the wireless charging device transmits a charging signal and receives the data signal from the sensor device simultaneously.

31. The method of claim 18, further comprising selecting the fast data transfer protocol or the slower data transfer protocol for the charging device receiving the data signal from the sensor device.

32. The method of claim 31, wherein the selection of the protocol is based on payment received from a user of the user device.

33. The method of claim 18, wherein the fast data transfer protocol is the Enhanced Shock Burst data protocol and the slower data transfer protocol is the Bluetooth protocol.

34. The method of claim 18, wherein the user device is one of a smart phone, a lap top computer, a tablet, or a personal data assistant.

\* \* \* \* \*